United States Patent [19]

Sasaki et al.

[11] Patent Number: 5,638,275
[45] Date of Patent: Jun. 10, 1997

[54] APPARATUS AND METHOD FOR CONTROLLING DAMPING FORCE CHARACTERISTIC OF VEHICULAR SHOCK ABSORBER

[75] Inventors: Mitsuo Sasaki; Hiroyuki Yamaguchi; Takeshi Fuchida, all of Atsugi, Japan

[73] Assignee: Unisia Jecs Corporation, Atsugi, Japan

[21] Appl. No.: 394,296

[22] Filed: Feb. 24, 1995

[30] Foreign Application Priority Data

Feb. 24, 1994 [JP] Japan .................................. 6-026535
Feb. 25, 1994 [JP] Japan .................................. 6-027625

[51] Int. Cl.$^6$ .................................................. B60G 17/00
[52] U.S. Cl. ........................... 364/424.047; 280/707
[58] Field of Search ..................... 364/424.05; 280/707

[56] References Cited

U.S. PATENT DOCUMENTS

| | | | |
|---|---|---|---|
| 5,231,583 | 7/1993 | Lizell | 364/424.05 |
| 5,374,113 | 12/1994 | Kaneda et al. | 303/116.2 |
| 5,398,184 | 3/1995 | Yamaoka et al. | 364/424.05 |
| 5,425,536 | 6/1995 | Teramura et al. | 788/280 |
| 5,440,488 | 8/1995 | Yamaoka et al. | 364/424.05 |
| 5,444,621 | 8/1995 | Matsunaga et al. | 364/424.05 |
| 5,467,280 | 11/1995 | Kimura | 364/424.05 |
| 5,485,377 | 1/1996 | Sasaki et al. | 364/424.05 |
| 5,488,562 | 1/1996 | Otterbein et al. | 364/424.05 |
| 5,510,985 | 4/1996 | Yamaoka et al. | 364/424.05 |
| 5,526,262 | 6/1996 | Kimura et al. | 364/424.05 |

FOREIGN PATENT DOCUMENTS

| | | |
|---|---|---|
| 0310094 | 4/1989 | European Pat. Off. . |
| 4141931 | 6/1993 | Germany . |
| 60-078807 | 5/1985 | Japan . |
| 63-221253 | 1/1989 | Japan . |
| 4-27612 | 1/1992 | Japan . |
| 4-191111 | 7/1992 | Japan . |
| 5-193322 | 8/1993 | Japan . |
| 5-286336 | 11/1993 | Japan . |
| 2270167 | 3/1994 | United Kingdom . |

*Primary Examiner*—Michael Zanelli
*Attorney, Agent, or Firm*—Foley & Lardner

[57] ABSTRACT

In an apparatus and method for controlling damping forces of vehicular shock absorbers, at least one of pitch rate or roll rate of the vehicle is derived on the basis of output signals from at least three of wheel speed sensors located on front road wheels and located on either of rear right and left road wheels.

17 Claims, 21 Drawing Sheets

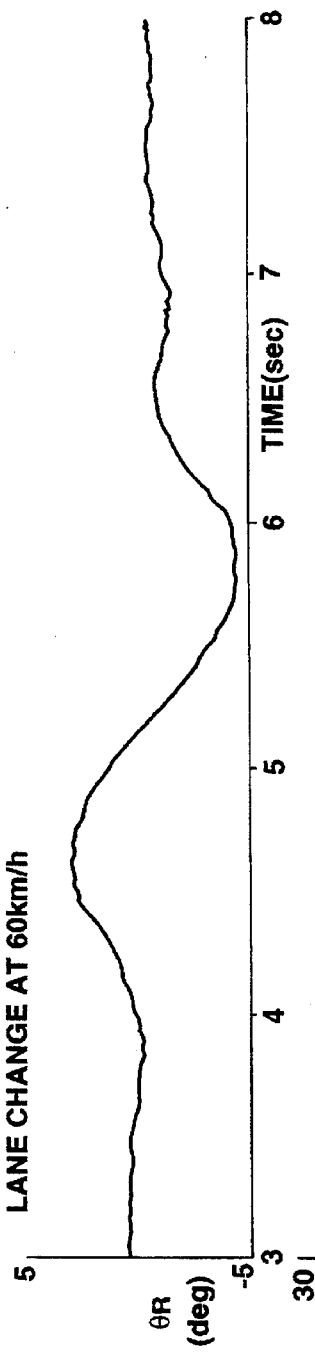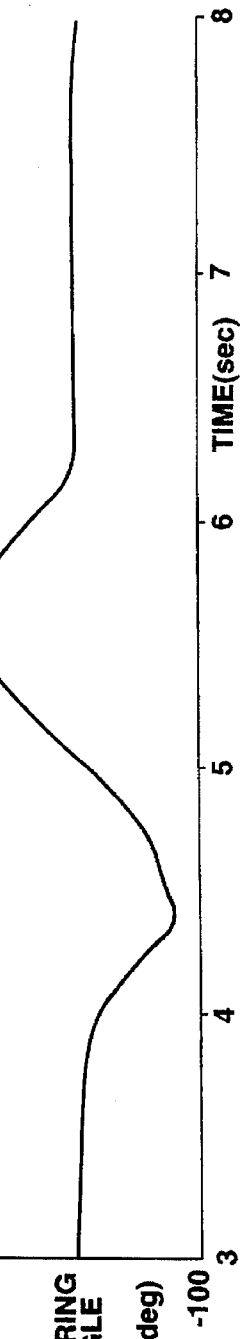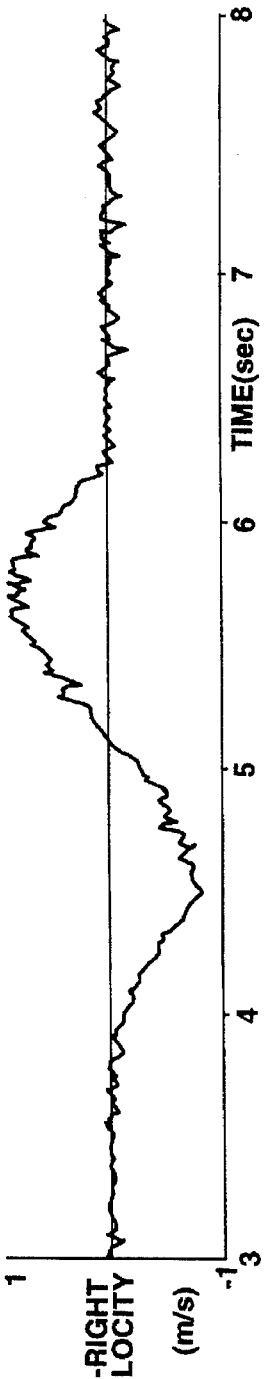
FIG.16A LANE CHANGE AT 60km/h
FIG.16B
FIG.16C
FIG.16D

APPARATUS AND METHOD FOR CONTROLLING DAMPING FORCE CHARACTERISTIC OF VEHICULAR SHOCK ABSORBER

BACKGROUND OF THE INVENTION

1. Field of the Invention

The present invention relates to an apparatus and method for optimally controlling damping force characteristics of four road wheel suspension units (hereinafter referred to as shock absorbers) of an automotive vehicle.

2. Description of Background Art

A Japanese Patent Application First Publication No. Heisei 4-27612 published on Jan. 30, 1992 exemplifies a first previously proposed damping force characteristic control apparatus.

In the first previously proposed damping force characteristic control apparatus, a plurality of vertical sprung mass acceleration sensors are disposed on a vehicle body located adjacent to the respective shock absorbers and they detect the vertical sprung mass accelerations at the respective road wheel positions. Vertical sprung mass velocities are calculated from the vertical acceleration signals of the respective vertical acceleration sensors, and a plurality of relative displacement sensors are disposed between a sprung mass and an unsprung mass so as to detect the relative displacements between the road wheels (unsprung mass) and vehicle body (sprung mass) so that vertical relative velocities at the respective road wheel positions are calculated.

When a product between each corresponding one of the vertical sprung mass velocity signals and that of the relative velocity signals is equal to or above a predetermined value, the damping force characteristic of the corresponding one of the shock absorbers is controlled using a hard damping force characteristic. On the contrary, when the product is below the predetermined value, the damping force characteristic of the corresponding one of the shock absorbers is controlled using a soft damping force characteristic.

A Japanese Patent Application First Publication No. Heisei 4-191111 published on Jul. 9, 1992 exemplifies a second previously proposed damping force characteristic control apparatus for respective shock absorbers interposed between a corresponding vehicular body (sprung mass) and tire wheel assemblies (unsprung mass).

In the above-identified Japanese Patent Application Publication (Heisei 4-191111, a plurality of actuators (shock absorbers) are each interposed between the vehicle body and a rear tire (road) wheel so as to enable an increase or decrease in a suspension force (damping force characteristic) on the vehicle body with respect to the corresponding rear tire (road) wheel. A vertical acceleration sensor is arranged so as to detect a vertical acceleration acted upon the vehicle body due to a vibration input from front tire wheels caused by a recess and convex formed on a road surface on which the vehicle is running. A vehicle speed sensor is arranged so as to detect the vehicle speed, and a control unit is arranged so as to control operations of the actuators on the basis of input signals from the above-described sensors that are provided in the vehicular suspension control apparatus.

The control unit described above is constructed so as to actuate the actuators, when determining that the vehicular body vertical acceleration detected from each of the vertical acceleration sensors exceeds a predetermined value, calculates a delay duration in time for which the rear road wheels have reached to the corresponding recess and convex portion of the road surface which has given the sprung mass vertical acceleration which exceeds the predetermined value and actuates the actuators described above according to the magnitude of the control signal derived by inverting a signal based on the vertical sprung mass acceleration after the calculated delay duration in time has passed upon passage of the front tire (road) wheels on the recess and convex portion of the road surface.

That is to say, in the above-identified Japanese Patent Application First Publication No. Heisei 4-191111, even when a relatively large vibration occurs on the vehicle body at the time when the front road tire wheels have passed such a recess and convex portion of the road surface as described above, the control for the rear road wheel side shock absorbers is carried out so as to cancel the vertical acceleration acted upon the vehicle body by referring to the vertical acceleration acted upon the vehicle body derived at the time when the front road wheels have passed on the recess and convex portion of the road surface, when the rear road wheels pass on the same recess and convex portion of the road surface. Consequently, when the rear road wheels have passed on the same recess and convex portion on the road surface, the vibration input derived at the time when the front road wheels have passed the same recess and convex portion of the road surface can be reduced.

It is noted that, in the above-described second previously proposed vehicular shock absorber control apparatus disclosed in the Japanese Patent Application First Publication No. Heisei 4-191111, a preview control such that a timing at which the control signal is used to control the damping forces of the shock absorbers located at the rear road wheel positions is retarded according to a vehicle speed is carried out and no elimination of the phase deviation of the filter processed signal is carried out.

SUMMARY OF THE INVENTION

It is an object of the present invention to provide an apparatus and method for controlling damping forces of vehicular shock absorbers in which determining accuracy and signal initial response characteristics of a vehicular roll rate and pitch rate can be enhanced, common use of sensors to another control system for a vehicle can be achieved, a low-cost damping force characteristic controlling apparatus can be achieved, a vehicular behavior in a wide range from a low vehicle speed to a high vehicle speed can effectively be suppressed, and a vehicular riding comfort can be improved.

The above-described object can be achieved by providing an apparatus for an automotive vehicle, comprising: a) a plurality of shock absorbers, each being interposed between a given position of a vehicle body and a corresponding one of front right, front left, rear right, and rear left road wheels located at the front right, front left, rear right, and rear left positions of the vehicle body and being so constructed and arranged as to enable its damping force characteristic to be varied; b) damping force characteristic changing means, responsive to an input drive signal, for varying the damping force characteristic of a corresponding one of the respective shock absorbers; c) a plurality of wheel speed sensors, which are so constructed and arranged as to detect wheel velocities of the road wheels located at the front right and left positions of the vehicle body and as to detect at least one of wheel velocities of the road wheels located at the rear right and rear left positions of the vehicle body; d) calculating means for calculating at least one of pitch rate and roll rate of the vehicle on the basis of detected output signals from said wheel speed sensors; e) vertical sprung mass behavior sensor means for detecting a sprung mass vertical behavior of the vehicle body; and f) damping force characteristic controlling means for calculating a bounce rate on the basis of the detected vertical sprung mass behavior, generating a control signal for each shock absorber on the basis of the calculated bounce rate, the pitch rate, and roll rate, either of the pitch rate or roll rate being calculated on the basis of the detected output signals of said wheel speed sensors or on the basis of the detected vertical sprung mass behavior of the vertical sprung mass behavior sensor means, and outputting the drive signal to said damping force characteristic control means associated with the corresponding one of the shock absorbers according to a value of the generated control signal.

The above-described object can also be achieved by providing a method for controlling vehicle shock absorbers, said vehicle shock absorbers comprising: a) a plurality of shock absorbers, each being interposed between a given position of a vehicle body and a corresponding one of front right, front left, rear right, and rear left road wheels located at the front right, front left, rear right, and rear left positions of the vehicle body and being so constructed and arranged as to enable its damping force characteristic to be varied, the method comprising the steps of: b) being responsive to an input drive signal, varying the damping force characteristic of a corresponding one of the respective shock absorbers; c) detecting wheel velocities of the road wheels located at the front right and left positions of the vehicle body and detecting at least one of wheel velocities of the road wheels located at the rear right and rear left positions of the vehicle body; d) calculating at least one of pitch rate and roll rate of the vehicle on the basis of detected output signals from said step c); e) detecting a sprung mass vertical behavior of the vehicle body; and f) calculating a bounce rate on the basis of the detected sprung mass vertical behavior, generating a control signal on the basis of the calculated bounce rate, the pitch rate, and roll rate calculated on the basis of the detected output signals at said step c) or step e) and outputting the drive signal at said step b) according to a value of the generated control signal.

BRIEF DESCRIPTION OF THE DRAWINGS

FIGS. 16A, 16B, 16C, and 16D are signal waveform charts of a roll angular signal, a yaw rate signal, a steering angle signal, and a left-and-right wheel velocity for explaining an operation in first, second, and third embodiments of the damping force characteristic control apparatus.

BEST MODE CARRYING OUT THE INVENTION

Reference will hereinafter be made to the drawings in order to facilitate a better understanding of the present invention.

Before explaining a first preferred embodiment of a damping force characteristic controlling apparatus according to the present invention, problems to be solved by the present invention are described below.

In the case of the first previously proposed vehicular shock absorber control apparatus disclosed in the Japanese Patent Application First Publication No. Heisei 4-27612 and described in the BACKGROUND OF THE INVENTION, (1) Since it is necessary to install, at minimum, three vehicular behavior sensors on three positions of the vehicle body (sprung mass) in order to control the damping force characteristics of the respective shock absorbers according to the detected bounce rate, pitch rate and roll rate signals, with the sprung mass behaviors in respective directions such as the sprung mass bounce rate, pitch rate, and roll rate detected, a cost of installing the vehicular shock absorber control apparatus accordingly becomes increased.

(2) Since other axis components due to a lateral acceleration acted upon the vehicle body during a steering operation of the vehicle are included in the vertical sprung mass behavior signal detected on the sprung mass, an accuracy of determining the roll rate becomes worsened.

(3) Initial responsive characteristics for the vertical sprung mass behavior signals are not preferable because the vertical sprung mass behaviors to the road input from the running road are detected on the sprung mass (vehicle body).

In the case of the second previously proposed vehicular shock absorber control apparatus disclosed in the Japanese Patent Application First Publication No. Heisei 4-191111 and described in the BACKGROUND OF THE INVENTION, (1) Although the vehicle body behaves in a bounce mode when the vehicle runs at a relatively high speed, the vehicle body behaves mainly in a pitch mode when the vehicle runs at a speed in a range from a relatively low speed to a relatively medium speed, the vehicular pitching at the vehicle run in the range from the low speed to the medium speed cannot effectively be suppressed only by means of the preview control for the rear road wheel positioned shock absorbers according to the vertical sprung mass accelerations at the front road wheel positioned shock absorbers.

First Embodiment

Figure 1:
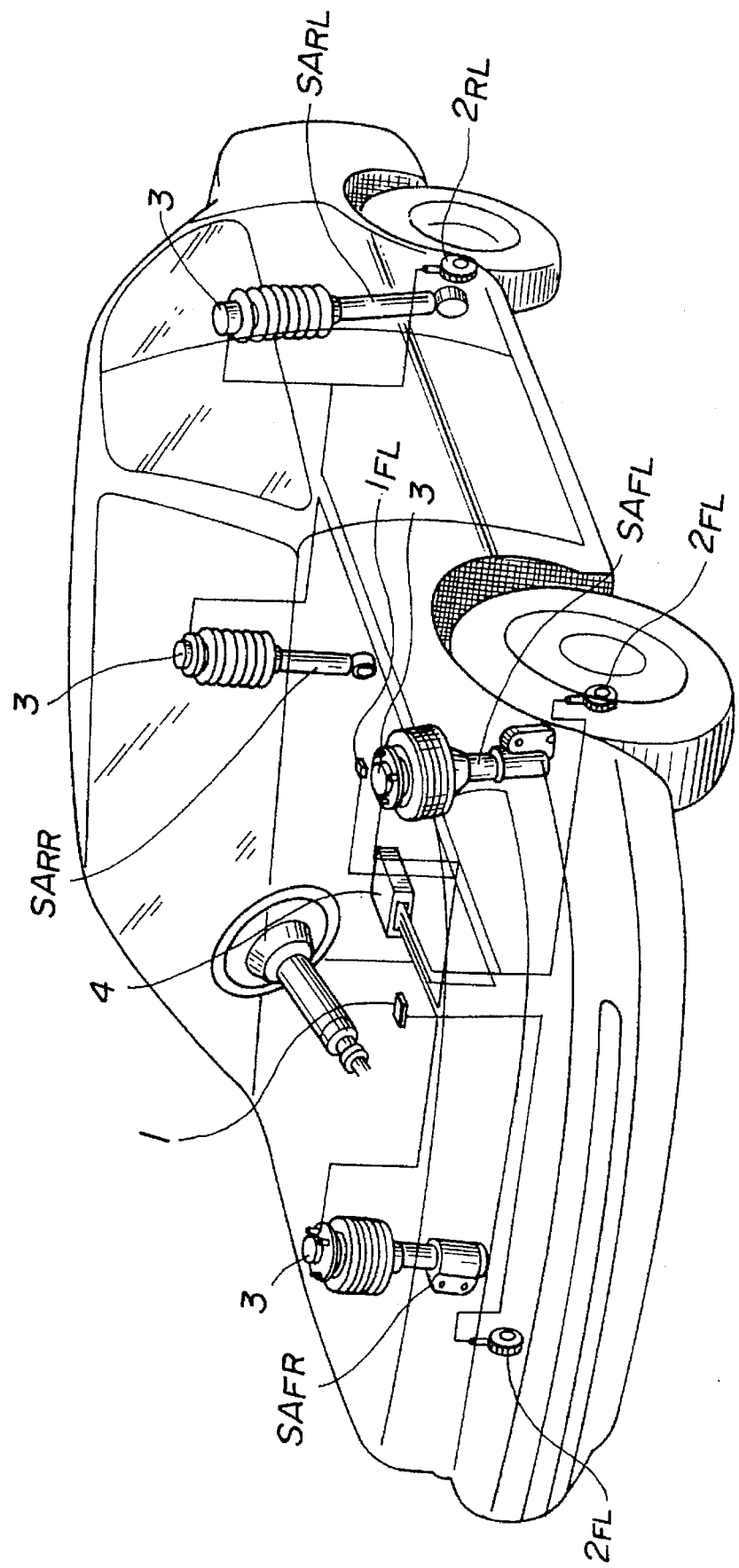
FIG. 1 is an explanatory view of an arrangement of the shock absorber damping force controlling apparatus in a first preferred embodiment according to the present invention.

FIG. 1 shows a whole system configuration of a vehicular shock absorber damping force characteristic controlling apparatus in a first preferred embodiment according to the present invention.

Four shock absorbers $SA_{FL}$, $SA_{FR}$, $SA_{RL}$, and $SA_{RR}$ (it is noted that subscripts FL denotes a front left road wheel side (position), FR denotes a front right road wheel side (position), RL denotes a rear left road wheel (position), RR denotes a rear right road wheel side, and a representative shock absorber is simply denoted by SA since all shock absorbers have the common structures) are interposed between given parts of a vehicular body (sprung mass) and respective road (tire) wheels (unsprung mass). The road wheels comprise front left tire wheel, front right tire wheel, rear left tire wheel, and rear right tire wheels of the vehicle. It is noted that the above-described given parts of the vehicular body indicate front left and right road wheel positions and rear left and right road wheel positions.

As shown in FIG. 1, a vertical acceleration (G) sensor 1 is attached onto a given position of the vehicular body to detect a vertical sprung mass acceleration acted upon the sprung mass (vehicle body). Three road wheel speed sensors (wheel speed sensor) $2_{FL}$, $2_{FR}$ and $2_{RL}$ are disposed on the front right, front left and rear left road wheels so as to detect the respective road wheel velocities.

Figure 2:
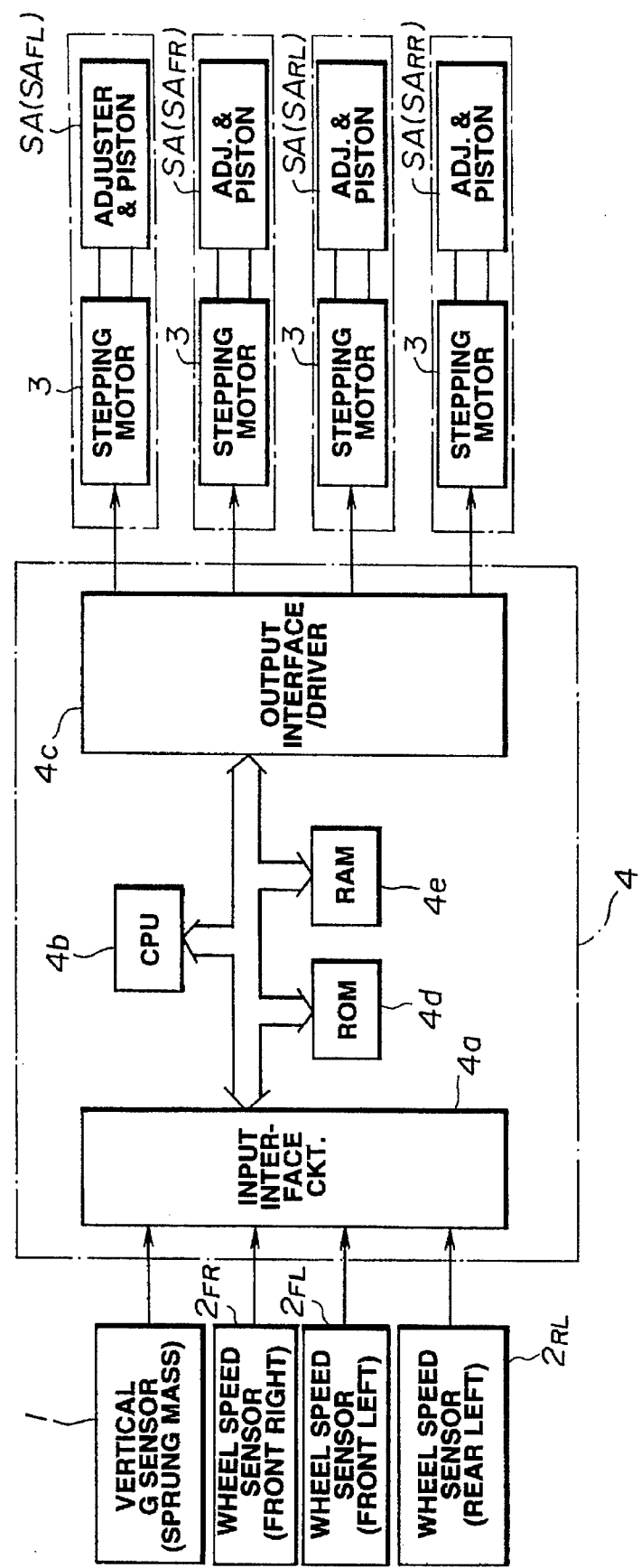
FIG. 2 is a circuit block diagram of a control unit and its peripheral circuit of the shock absorber damping force controlling apparatus shown in FIG. 1.

FIG. 2 shows a circuit block diagram of the vehicular shock absorber damping force controlling apparatus in the first embodiment according to the present invention shown in FIG. 1.

Referring to FIGS. 1 and 2, a control unit 4 is installed on a portion of the vehicular body near to a driver's seat. The control unit 4 includes an input interface circuit 4a; a CPU (Central Processing Unit) 4b; a ROM (Read Only Memory) 4d; a RAM (Random Access Memory) 4e; an output interface/driver circuit 4c; and a common bus. The control unit 4 functionally includes a damping force characteristic control circuit which receives signals from the vertical G (Gravity) sensor 1 and the respective wheel speed sensors $2_{FL}$, $2_{FR}$, and $2_{RL}$ and outputs a drive signal to each one of stepping motors 3 associated with a corresponding one of the shock absorbers SA ($SA_{FR}$, $SA_{FL}$, $SA_{RR}$, $SA_{RL}$). The control unit 4 also functionally includes an anti-skid control circuit which receives the signals from the respective wheel speed sensors described above, detects a slip condition of each road wheel during a vehicular braking operation on the basis of the input signals of the respective wheel speed sensors $2_{FL}$, $2_{FR}$, and $2_{RL}$, and carries out a reduction in a braking force to prevent the wheel's locked state when a detected slip rate is equal to or above a predetermined value through a control valve of a corresponding braking pressure cylinder (not shown).

An anti-skid control system including the control unit 4 is exemplified by a U.S. Pat. No. 5,374,113 issued on Dec. 20, 1994 and a United States patent application Ser. No. 08/116,769 (now U.S. Pat. No. 5,427,441) filed on Sep. 7, 1993 which corresponds to a German Patent Application First Publication No. DE 43 30 076 A1 published on Mar. 17, 1994 (the disclosures of both United States Patent and United States Patent Application identified above being herein incorporated by reference).

Figure 3:
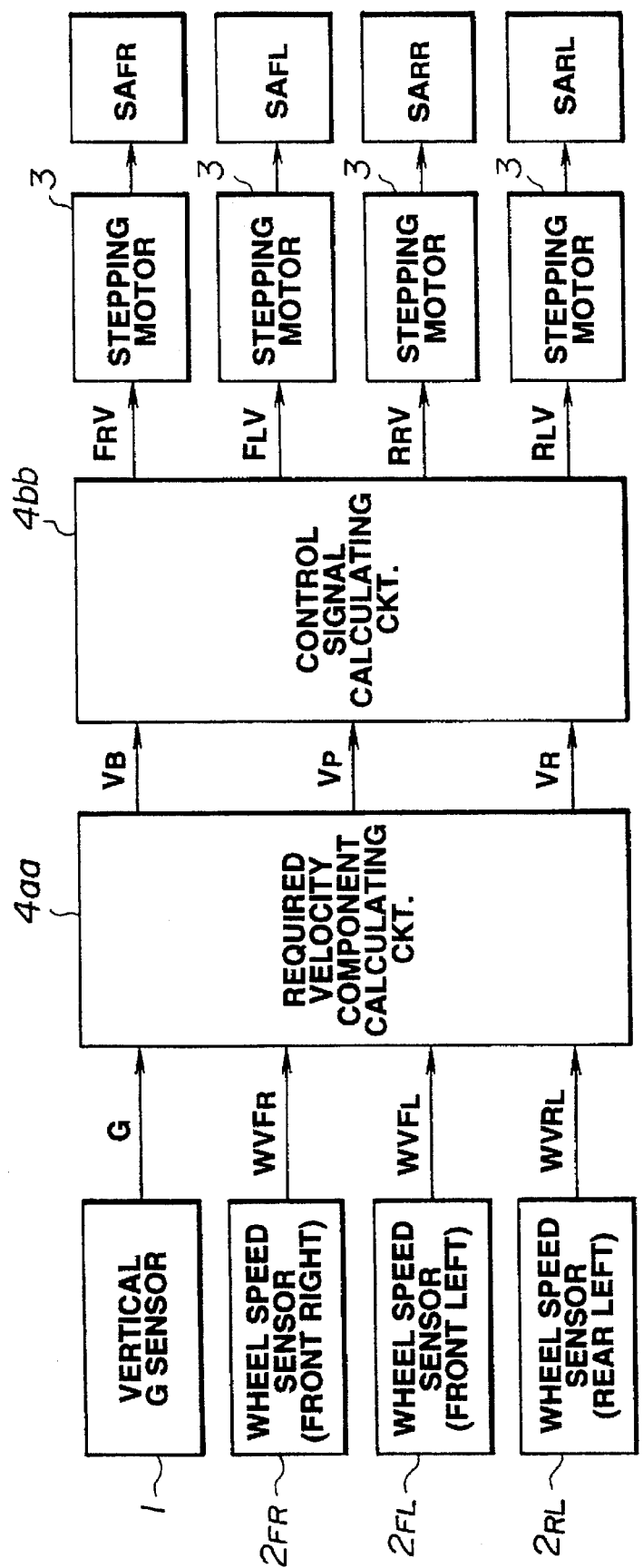
FIG. 3 is a schematic circuit block diagram of the shock absorber damping force controlling apparatus in the first preferred embodiment according to the present invention shown in FIG. 2.

FIG. 3 shows a circuit block diagram of the damping force characteristic controlling apparatus in the first preferred embodiment according to the present invention. The detailed explanation of FIG. 3 will be made later.

Figure 4:
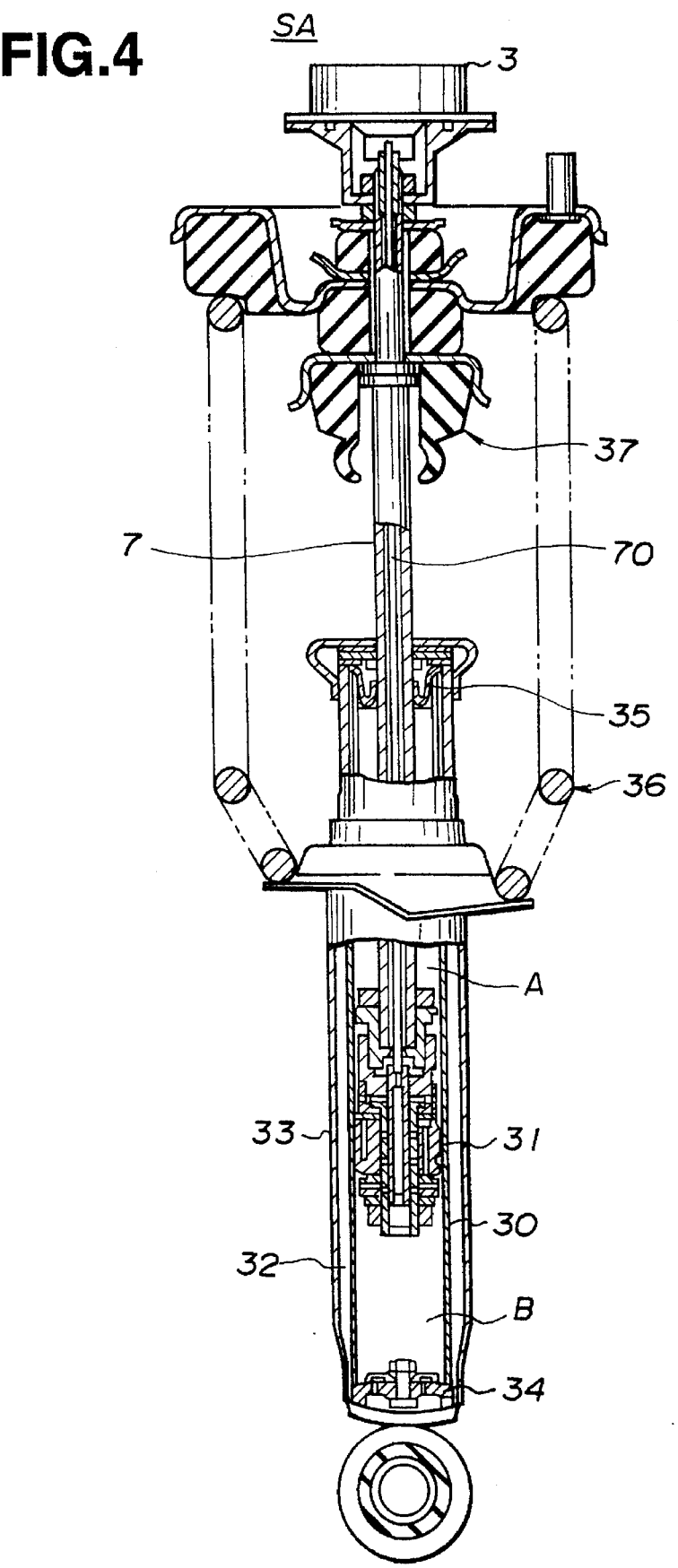
FIG. 4 is a partially sectional view of each shock absorber SA used in the first embodiment shown in FIGS. 2 and 3.

Next, FIG. 4 show a cross sectional view of each shock absorber SA ($SA_{FL}$ through $SA_{RR}$).

The shock absorber SA, as shown in FIG. 4, includes: a cylinder 30, a (movable) piston 31 defining an upper portion chamber A and a lower portion chamber B; an outer envelope 33 in which a reservoir chamber 32 is formed on an outer peripheral end of the cylinder 30; a base 34 which defines the lower chamber B and the reservoir chamber 32; a guide member 35 which guides a sliding motion of a piston rod 7 with the other end of which the movable piston 31 is linked; a suspension spring 36 interposed between the outer envelope 33 and vehicle body; and a bumper rubber 37.

Each stepping motor 3 shown in FIGS. 2 and 3 is installed in an upper position of the corresponding one of the shock absorbers SA, as shown in FIG. 4, so as to operatively rotate an adjuster 40 (refer to FIG. 5) via a control rod 70 in response to a rotation drive signal from the output driver 4c. A rotating shaft of the corresponding one of the stepping motors 3 is mechanically connected to the corresponding adjuster 40 within each shock absorbers SA via the control rod 70.

Figure 5:
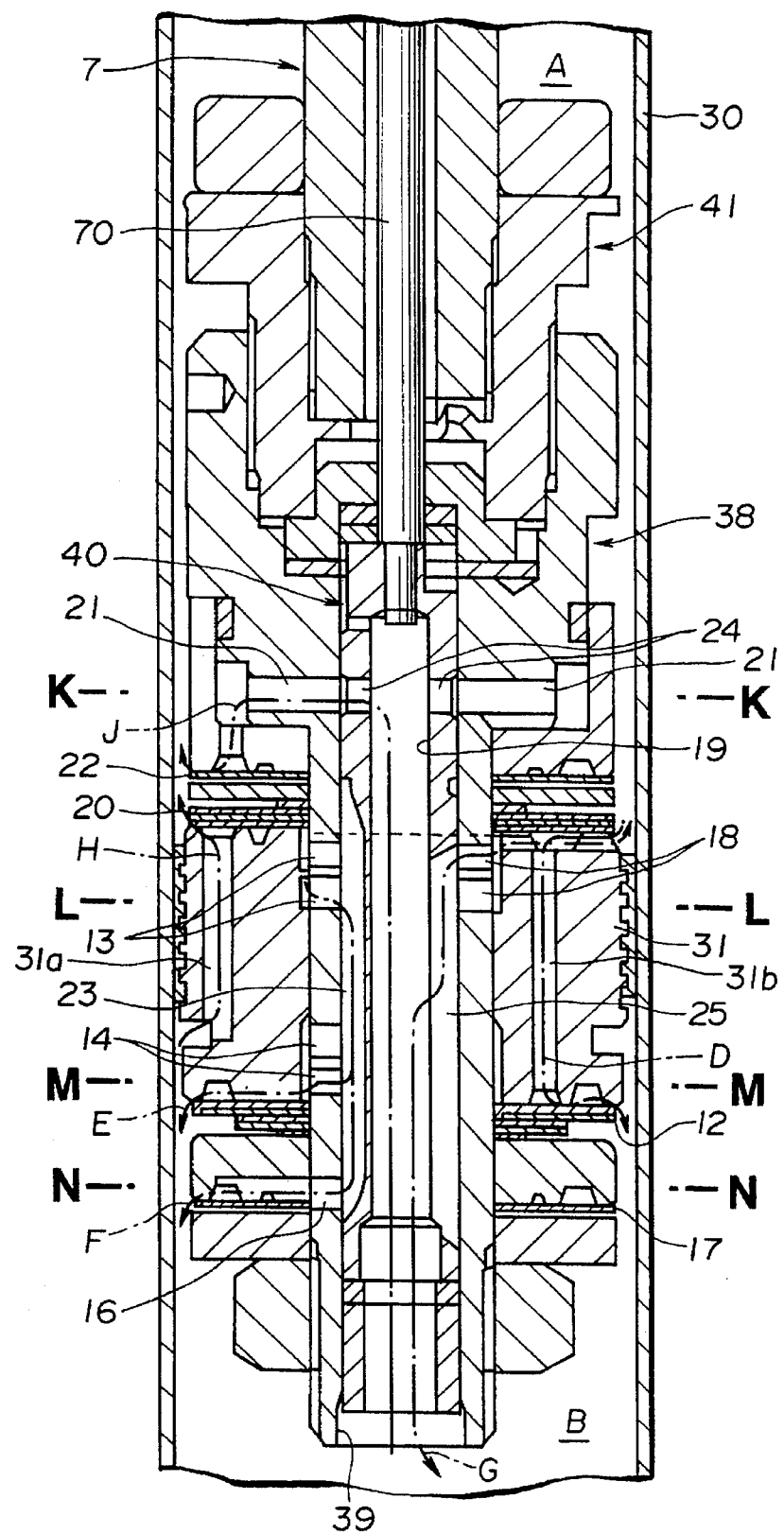
FIG. 5 is an enlarged, partially sectional view of the representative shock absorber SA shown in FIG. 8.

FIG. 5 shows an enlarged cross sectional view representing a part of the piston assembly 31 and its surrounding part of each of the shock absorbers SA.

As shown in FIG. 5, the piston 31 is formed with penetrating holes 31a and 31b. In addition, the piston 31 is provided with a compression stroke side attenuation valve 20 and an extension stroke side attenuating valve 12 respectively opening and closing the respective penetrating holes 31a and 31b. A stud 38 is spirally meshed with and fixed to a bound stopper 41 spirally meshed with and fixed to a tip end of the piston rod 7. The stud 38 is penetrated through the piston 31. In addition, the stud 38 is formed with a communication hole 39 which communicates the upper portion chamber A and the lower portion chamber B. Furthermore, the adjuster 40 which changes a flow passage cross sectional area of the communication hole 39 is provided in the piston assembly.

Furthermore, an extension stroke side check valve 17 and a compression (or contraction) stroke side check valve 22 are also installed which enable and disable the fluid flow through the communication hole 39 in accordance with the direction of the flow of the fluid.

It is noted that the stud 38 is formed with a first port 21, a second port 13, a third port 18, a fourth port 14, and fifth port 16, respectively, in an upper order.

On the other hand, referring to FIG. 5, the adjuster 40 is formed with a hollow portion 19, a first lateral hole 24, and a second lateral hole 25, both lateral holes communicating the internal and external portions of the adjuster 40. A longitudinal groove 23 is formed on an outer peripheral portion. Hence, four flow passages are formed between the upper portion chamber A and lower portion chamber B as the fluid flow passages when the piston stroke indicates the extension stroke: that is to say, 1) an extension stroke side first flow passage D such that the fluid passes through the penetrating hole 31b, a valve opened internal side of the extension stroke side attenuation valve 12, and reaches the lower portion chamber B; 2) an extension stroke side second flow passage E in which the fluid flows through the second port 13, the longitudinal groove 23, the fourth port 14, a valve opened outer peripheral side of the extension stroke side attenuating valve 12, and reaches the lower portion chamber B; 3) an extension stroke side third flow passage F in which the fluid passes through the second port 13, the longitudinal groove 23, and the fifth port 16; and 4) a bypass flow passage G in which the fluid passes through the third port 18, the second lateral hole 25, and the hollow portion 19 and reaches the lower portion chamber B.

In addition, the three fluid flow passages through which the fluid can be caused to flow during the compression stroke side of the piston 31 include: 1) a compression stroke side first flow passage H in which the fluid flows through the penetrating hole 31a and valve opened compression stroke side attenuating valve 20; 2) a compression stroke side second flow passage J in which the hollow portion 19, the first lateral hole 24, the first port 21, and the opened compression stroke side check valve 22 and reaches the upper portion chamber A; and 3) the bypass passage G in which the fluid flows through the hollow portion 19, the second lateral hole 25, and the third port 18.

Figure 6:
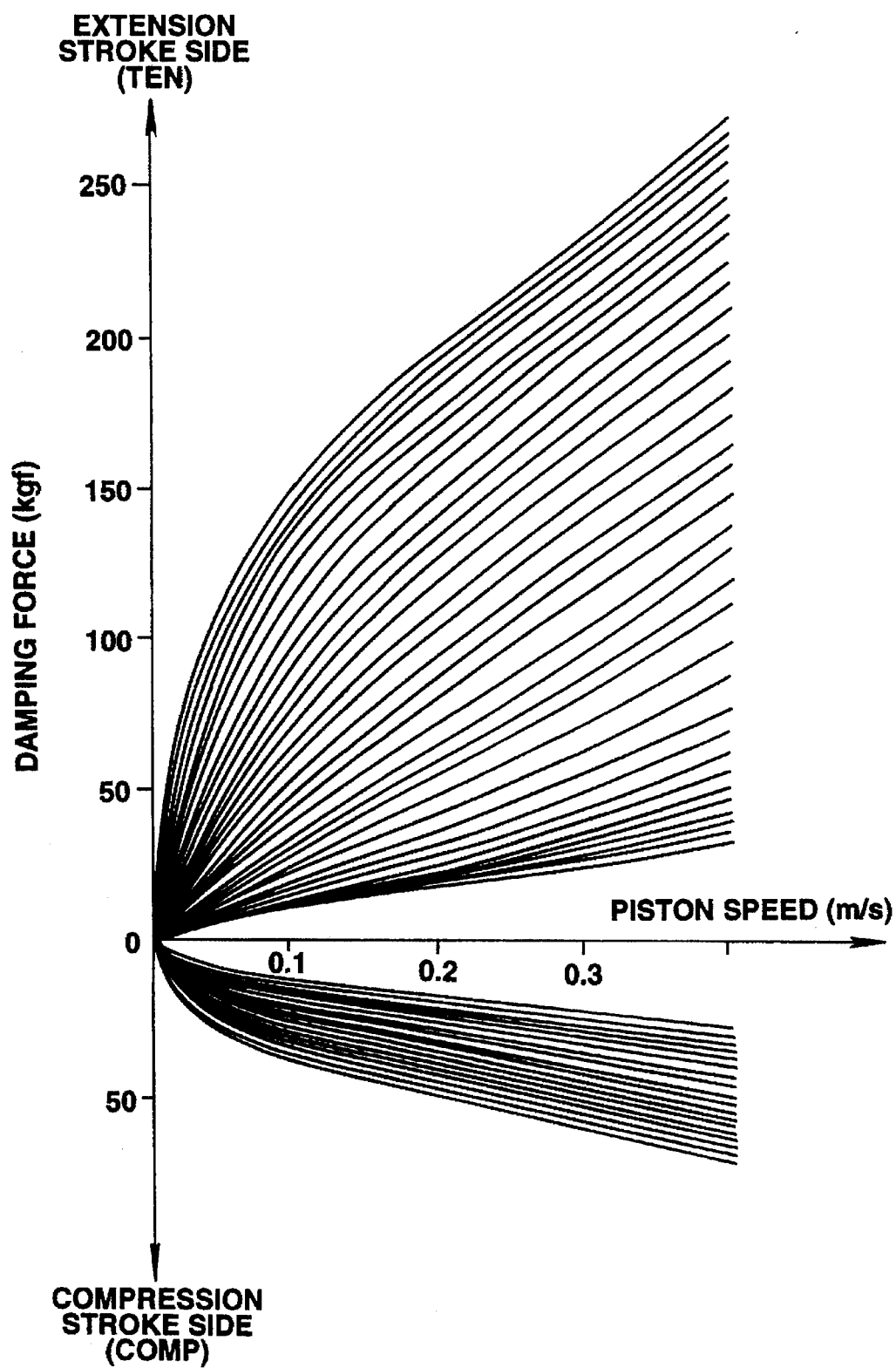
FIG. 6 is a characteristic graph representing damping forces with respect to a piston speed of the representative shock absorber shown in FIGS. 4 and 5.

In summary, the shock absorber SA is constructed so as to be enabled to change the damping force characteristics at a multiple stage in its damping characteristic, as shown in FIG. 6, either in the extension stroke side or compression stroke side when the adjuster 40 is pivoted according to the rotation of the corresponding one of the stepping motors 3.

Figure 7:
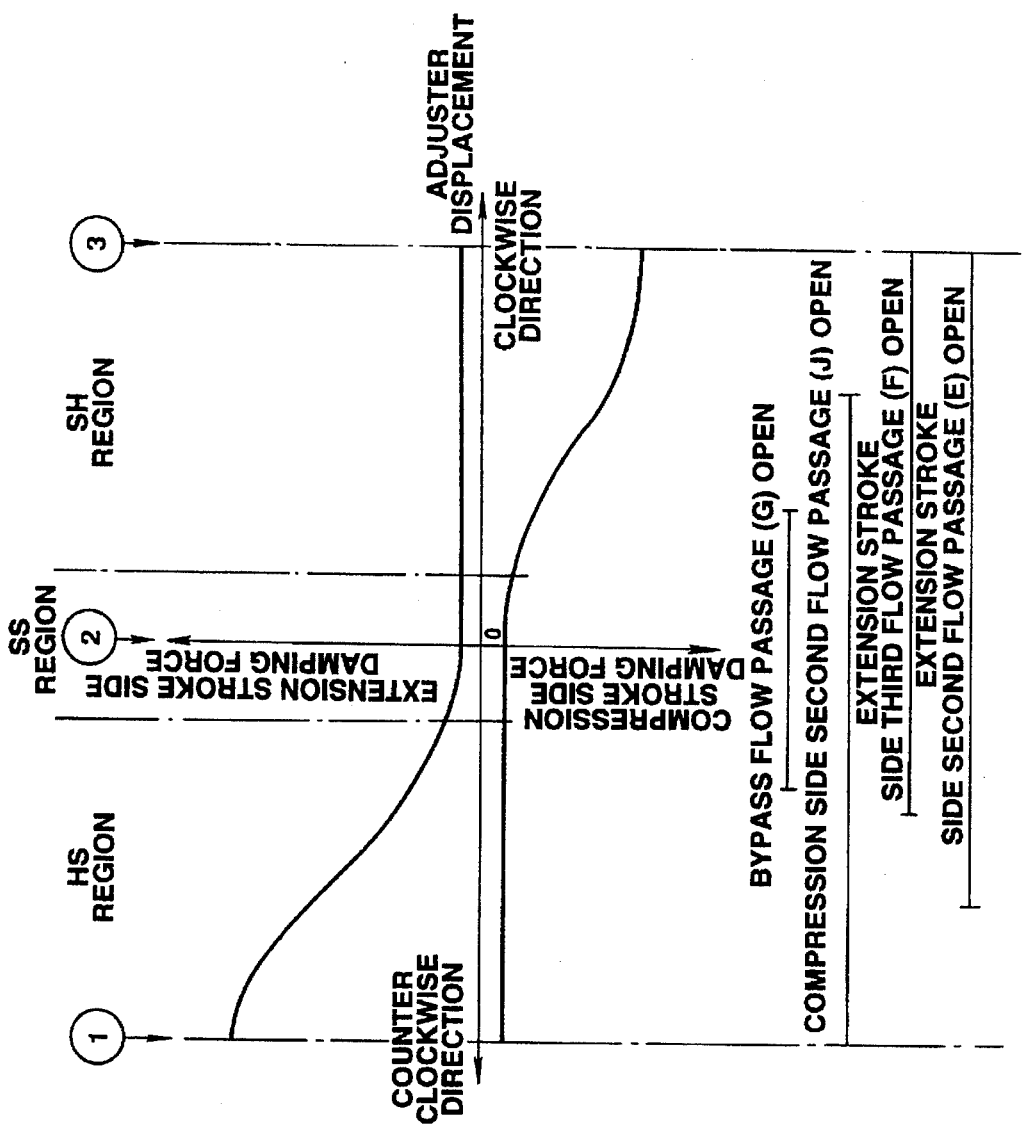
FIG. 7 is a damping coefficient characteristic graph representing a damping force region corresponding to a stepped position of an adjuster according to the rotation of a representative pulse (stepping) motor shown in FIGS. 2 and 8.

FIG. 7 shows relationships between the rotated position of the adjuster 40 and damping force characteristics at both the extension stroke and compression stroke sides with respect to the piston 31.

In more detail, as shown in FIG. 7, when the adjuster 40 is pivoted in a given counterclockwise direction from a generally center position at which both of the extension and compression stroke sides are in soft damping force characteristic positions (hereinafter, referred to as a soft region SS), the damping force coefficient at the extension stroke side can be changed at the multiple stage from a maximum hard to a minimum hard characteristic but the compression stroke side is fixed at a soft position (hereinafter, referred to as an extension stroke side hard region HS). On the contrary, when the adjuster 40 is pivoted in a given clockwise direction therefrom, the damping force coefficient at the compression stroke side is only changeable to a hard region from the maximum hard to the minimum hard characteristic at the multiple stages and the damping force characteristic at the compression stroke side is fixed to the soft position (hereinafter, referred to as a compression hard region SH).

Figure 8A:
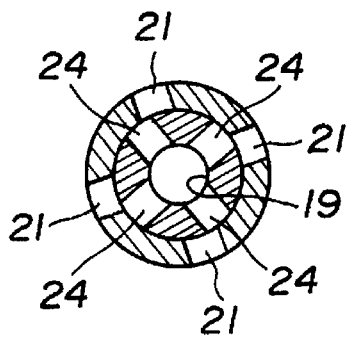
FIGS. 8A, 8B, and 8C are cross sectional views cut away along a line K—K of FIG. 7 representing an essential part of the representative shock absorber shown in FIGS. 4 and 5.
Figure 8B:
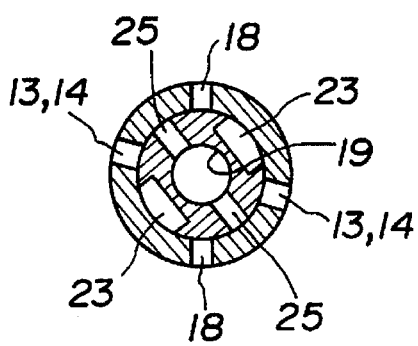
Figure 8C:
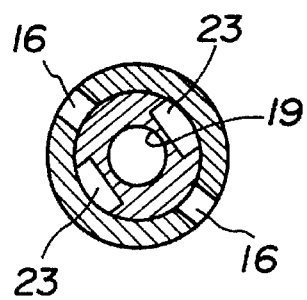
Figure 9A:
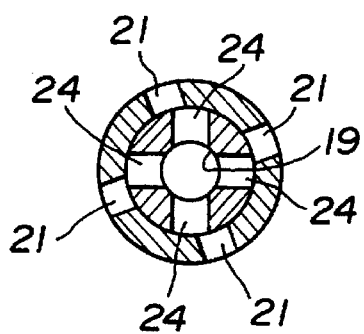
FIGS. 9A, 9B, and 9C are cross sectional views cut away along lines L—L and M—M of FIG. 7 representing an essential part of the representative shock absorber shown in FIGS. 4 and 5.
Figure 9B:
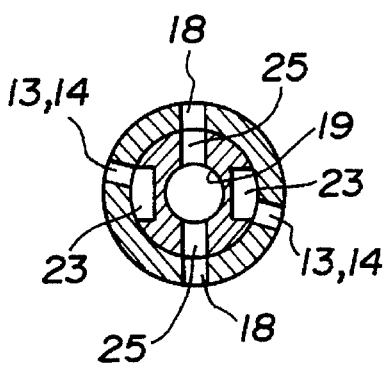
Figure 9C:
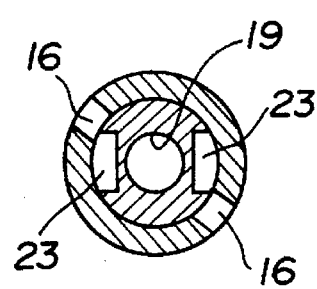
Figure 10A:
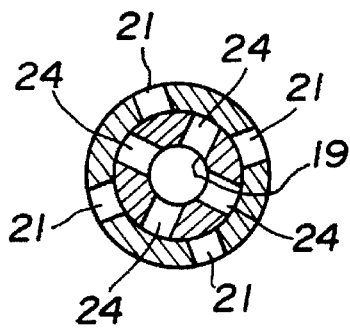
FIGS. 10A, 10B, and 10C are cross sectional views cut away along a line N—N of FIG. 7 representing an essential part of the representative shock absorber shown in FIGS. 4 and 5.
Figure 10B:
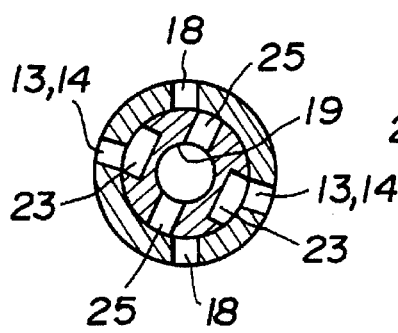
Figure 10C:
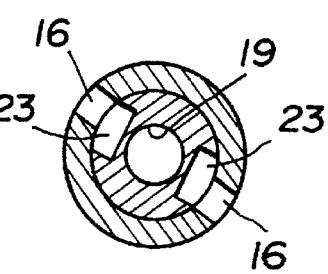

When, as shown in FIG. 7, the adjuster 40 is pivoted at any one of positions ①, ②, and ③, cross sections of the piston assembly portions cut away along lines K—K, L—L, M—M, and N—N of FIG. 5 are respectively shown in FIGS. 8A (①), 8B (②), and 8C (③) (K—K), 9A (①), 9B (②), and 9C (③) (L—L, M—M), 10A (①), 10B (②), and 10C (③) (N—N), respectively. The damping force characteristics at the respective positions ①, ②, and ③ shown in FIG. 7 are shown in FIGS. 11, 12, and 13, respectively.

Figure 11:
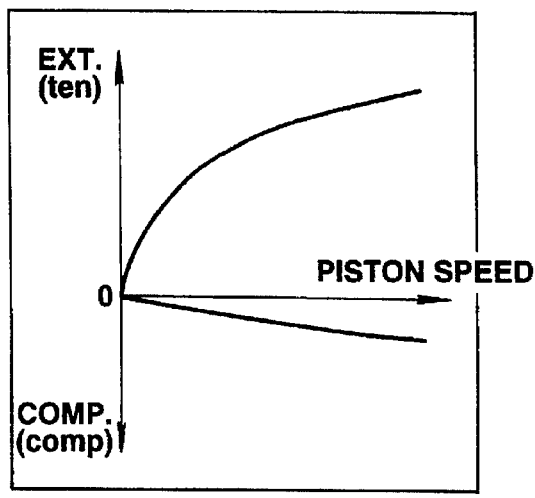
FIG. 11 is a damping force characteristic graph when an extension stroke side with respect to the piston of the representative shock absorber shown in FIG. 4.

FIG. 11 shows the damping force characteristic Of the representative shock absorber SA when the adjuster 40 is positioned at ① of FIG. 7.

Figure 12:
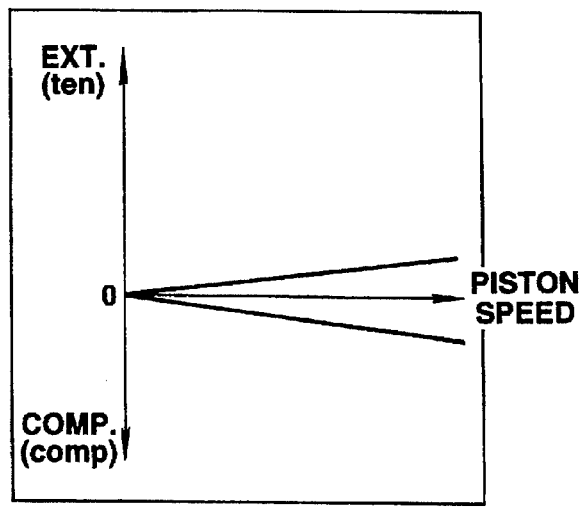
FIG. 12 is a damping force characteristic graph when both extension and compression stroke sides are in soft damping force states.

FIG. 12 shows that when the adjuster 40 is positioned at ② of FIG. 7.

Figure 13:
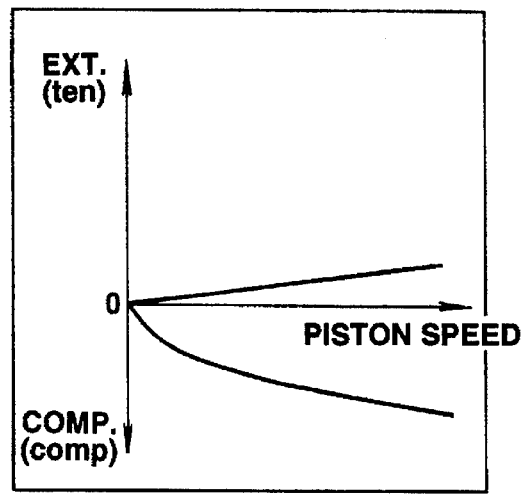
FIG. 13 is a damping force characteristic graph when the compression stroke side is in a hard damping force state.

FIG. 13 shows that when the adjuster 40 is positioned at ③ of FIG. 7.

Referring back to FIG. 3, the damping force characteristic control circuit for each shock absorber SA includes: a required velocity component calculating circuit 4aa which calculates a vehicular bounce component $V_B$ from a signal into which the vertical sprung mass acceleration signal input from the vertical G sensor 1 is converted and which calculates a pitch component $V_p$ and a roll component $V_R$ on the basis of input signals from the respective wheel speed sensors $2_{FL}$, $2_{FR}$, and $2_{RL}$; and a control signal calculating circuit 4bb which calculates a control signal V ($F_R V$, $F_L V$, $R_R V$, and $R_L V$) to carry out the damping force characteristic control for each shock absorber SA.

Figure 14A:
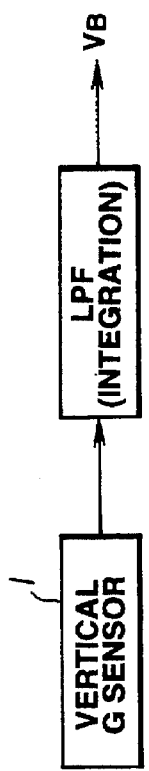
FIGS. 14A, 14B, and 14C is a signal processing circuit for an input sprung mass vertical acceleration signal G and those for output signals of wheel speed sensors in the case of the first embodiment shown in FIGS. 2 through 13.
Figure 14B:
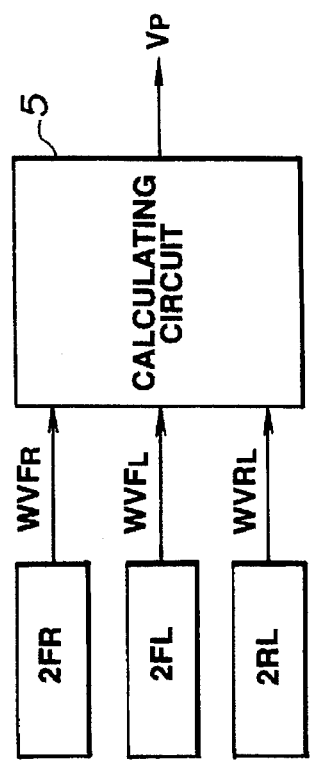
Figure 14C:
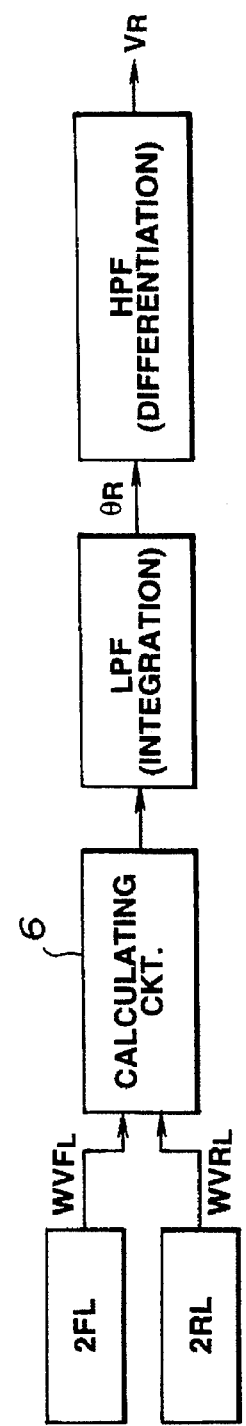

The required velocity component calculating circuit 4aa includes processing circuits shown in FIGS. 14A, 14B, and 14C.

FIG. 14A shows one of the signal processing circuits which derives the vehicular bounce component $V_B$.

As shown in FIG. 14A, the signal processing circuit includes a LPF (for example, a Butterworth first-order low pass filter) which serves to integrate the vertical sprung mass acceleration signal from the vertical G sensor 1 so as to derive the vehicular bounce component (vertical sprung mass velocity) $V_B$.

FIG. 14B shows one of the signal processing circuits which derives the vehicular pitch component $V_p$ on the basis of the input signals of the respective wheel speed sensors $2_{FL}$, $2_{FR}$, and $2_{RL}$.

As shown in FIG. 14B, the signal processing circuit includes a calculating circuit 5 which calculates the pitch component $V_p$ on the basis of the following equations:

$$V_{p(n)} = (WVFL_{(n)} + WVFR_{(n)} + WVRL_{(n)})/4 \qquad (1)$$

$$V_P = (V_{p(n)} + V_{p(n)} + \cdots + V_{p(n-m)})/(m+1) \quad (2)$$

In the equations (1) and (2), WVFL denotes the wheel velocity of the front left road wheel, WVFR denotes the wheel velocity of the front right road wheel, WVRL denotes the wheel velocity of the rear left road wheel, (n) denotes a sampled data at an arbitrary time, (n−1) denotes a sampled data before one sampling time to the sampled data at the arbitrary time (n), and (m) denotes an arbitrary integer.

Figure 15A:
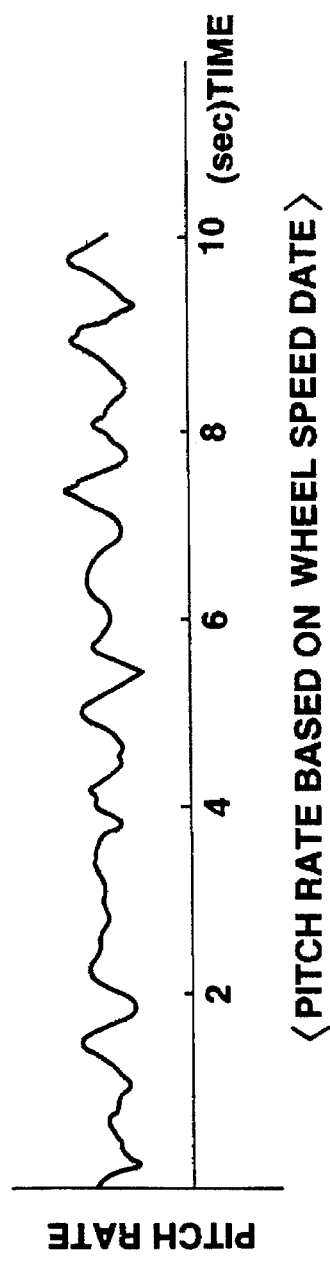
FIG. 15A and 15B are characteristic graphs representing pitch rates based on wheel speed data and actually measured pitch rate by means of gyroscope, respectively.
Figure 15B:
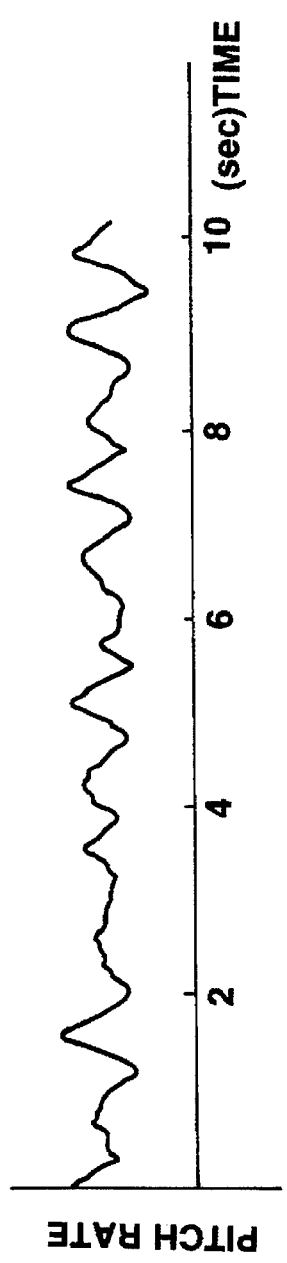

FIGS. 15A and 15B shows waveforms of the calculated pitch rate based on the pitch component $V_p$ calculated using the above-equations (1) and (2) and of an actually measured pitch rate by means of a gyroscope, respectively.

As shown in FIGS. 15A and 15B, the vehicular pitch rate can be derived by calculating an average value of each wheel speed data.

FIG. 14C shows one of the signal processing circuits which calculates the roll component $V_R$.

As shown in FIG. 14C, the signal processing circuit includes: a calculating circuit 6 which derives a yaw rate signal Y using the following equation (3); a low pass filter (LPF) which integrates the yaw rate signal Y to derive a roll angular signal $\theta_R$; and a high pass filter (HPF) which differentiates the roll angular signal $\theta_R$ to derive the roll component $V_R$.

$$Y = WVFR_{(n)} - WVFL_{(n)} \quad (3)$$

FIGS. 16A, 16B, 16C, 16D show the roll angular signal $\theta_R$, an actually measured yaw rate signal Y by means of the gyroscope, an actually measured steering angle signal, and the difference between the left-and-right wheel speed data, when the vehicle runs and carries out a lane change at the speed of 60 Km/h, respectively.

As shown in FIGS. 16A through 16D, the vehicular roll component can accurately be calculated by deriving the velocity difference between the left road wheel speed and the right road wheel speed.

Figure 17:
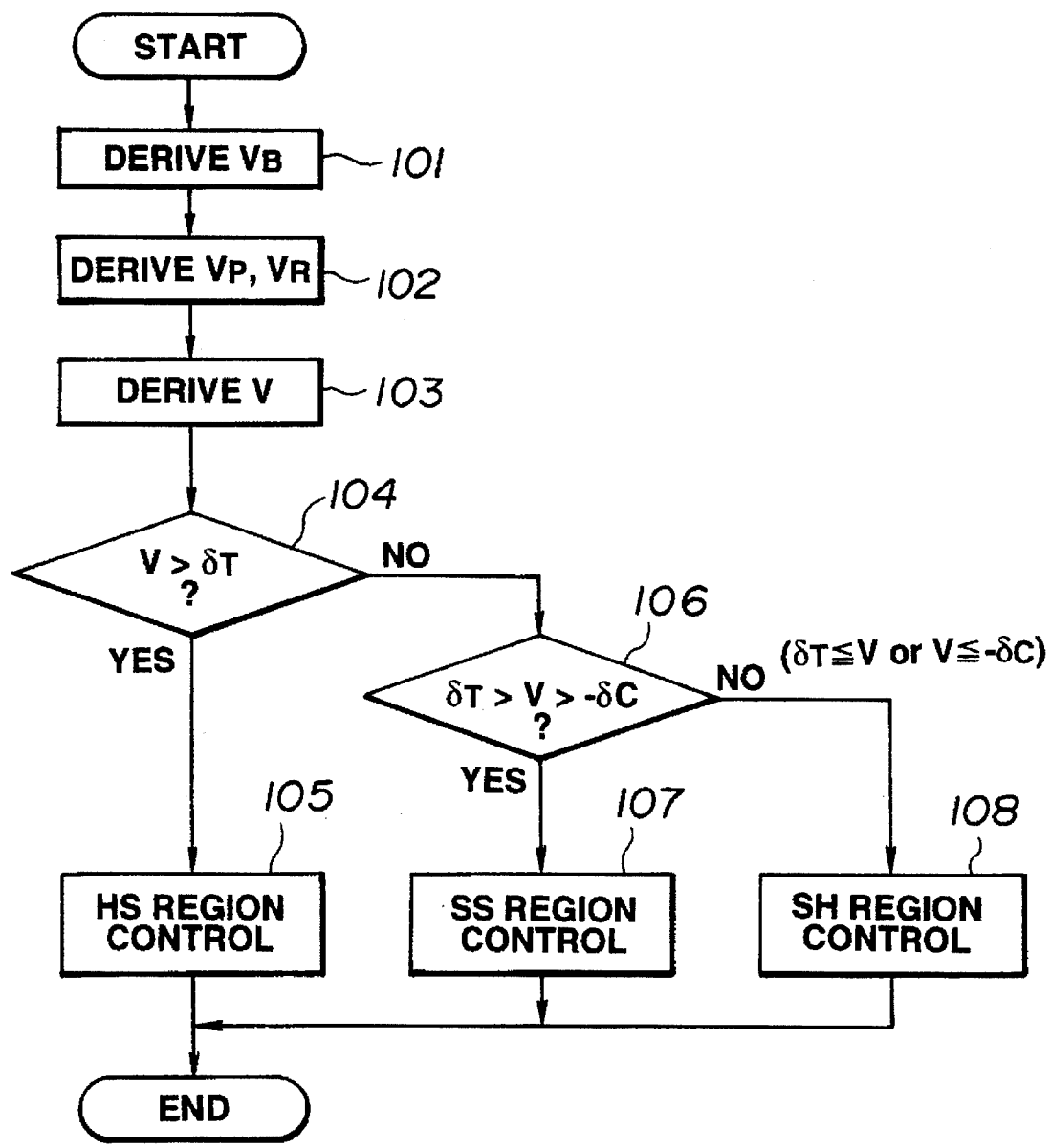
FIG. 17 is an operational flowchart indicating a control operation to derive control signals executed in a control unit of the first embodiment shown in FIGS. 2 through 13.

FIG. 17 shows an operational flowchart executed by the damping force characteristic control circuit in the control unit 4. It is noted that the program flowchart of FIG. 17 is executed independently for each shock absorber SA.

At a step 101, the CPU 4b fetches data on the sprung mass vertical acceleration acted upon the given part of the vehicular body from the vertical sprung mass G sensor 1 and calculates the bounce component $V_B$ based on the vertical sprung mass velocity derived through the low pass filter LPF shown in FIG. 14A. It is noted that a positive value of the bounce component $V_B$ indicates an upward direction (toward the vehicle body) with respect to the earth and a negative value thereof indicates a downward direction (toward the road wheel position) with respect to the earth.

At a step 102, the CPU 4b reads the wheel velocity signals of the respective road wheels from the respective road wheel speed sensors $2_{FL}$, $2_{FR}$ and $2_{RL}$, derives the vehicular pitch component $V_p$ through the signal processing circuit shown in FIG. 14B, and derives the vehicular roll component $V_R$ through the signal processing circuit shown in FIG. 14C.

It is noted that a positive value of the pitch component $V_p$ indicates a squat direction of the vehicle, a negative value thereof indicates a dive direction of the vehicle, a positive value of the roll component $V_R$ indicates a left direction with respect to a vehicular forwarding direction, and a negative value thereof indicates a right direction with respect thereto.

It is also noted that the sprung mass vertical velocity $V_n$ has a positive value when a direction of the velocity $V_n$ is upward (height direction of the vehicle body) and has a negative value when a direction thereof is downward (ground direction of the vehicle body).

At a step 103, the CPU 4b calculates the control signal V (FLV, FRV, RLV, RRV) for each shock absorber SA on the basis of the following equations (4) through (7).

$$FRV = \alpha_f V_B + \beta_f V_p + \tau_f V_R \quad (4)$$

$$FLV = \alpha_f V_B + \beta_f V_p - \tau_f V_R \quad (5)$$

$$RRV = \alpha_r V_B - \beta_r V_p + \tau_r V_R \quad (6)$$

$$RLV = \alpha_r V_B - \beta_r V_p - \tau_r V_R \quad (7)$$

wherein $\alpha_f$, $\beta_f$, and $\tau_f$ denote proportional constants for the front road wheels, and $\alpha_r$, $\beta_r$, and $\tau_r$ denote proportional constants for the rear road wheels, $\alpha_f \cdot V_B$ and a $\alpha_r \cdot V_B$ denote the bounce rates at the front and rear road wheel positions of the vehicle body, $\beta_f V_p$ and $\beta_r \cdot V_p$ denote pitch rates at the front and rear road wheel positions of the vehicle body, and $\tau_f V_R$ and $\tau_r \cdot V_R$ denote roll rates at the front and rear road wheel positions of the vehicle body.

At a step 104, the CPU 4b determines whether or not the derived control signal V is equal to or above a predetermined threshold value $\delta_T$.

If Yes ($V \geq \delta_T$) at the step 104, the routine goes to a step 105 in which the corresponding one of the shock absorbers SA is controlled in the HS region such that the extension stroke side thereof is set to a hard damping force characteristic.

If No at the step 104, the routine goes to a step 106.

At the step 106, the CPU 4b determines whether the control signal value falls in a range between the predetermined threshold value $\delta_T$ and another predetermined threshold value $-\delta_C$ ($\delta_T < V < -\delta_C$).

If Yes at the step 106, the routine goes to a step 107 in which the corresponding one of the shock absorbers SA is controlled in the SS region such that both extension and compression stroke sides are controlled in the soft damping force characteristics.

If No at the step 106, the routine goes to a step 108. If No at the step 103, the routine goes to the step 108. At the step 108, since the control signal V is below the other predetermined threshold value $-\delta_C$, the corresponding one of the shock absorbers SA is controlled in the SH region such that the compression stroke side is controlled in the hard damping force characteristic.

FIGS. 18A through 18E show timing charts of the control operations in the damping force characteristic controlling apparatus in the first embodiment.

The control signal V has a value which falls between the predetermined positive and negative threshold values $\delta_T$ and $-\delta_C$, the representative shock absorber SA is controlled in the SS region mode (both extension and compression stroke sides are in the soft damping force characteristic regions).

When the control signal V exceeds the predetermined positive threshold value $\delta_T$, the extension stroke side region is controlled in the HS region (hard damping force characteristic side in which the damping force characteristic is varied in proportion to the value of the control signal V. At this time, the damping force characteristic C is controlled as C=k·V. k denoting the proportional constant.

In addition, when the control signal V is below the predetermined negative threshold value $-\delta_C$, the compression stroke side is controlled in the compression stroke side hard region SH and the damping force characteristic at the compression stroke side is varied in accordance with the value of the control signal V with the compression stroke side fixed to the soft region. At this time, the damping force characteristic C is $C = k_c \cdot V$. A symbol $k_c$ denotes a proportional constant at the compression stroke side.

When the control signal V has the same sign as that of relative velocity between the sprung mass and the unsprung mass (regions b and d of FIG. 18C), the stroke side of the shock absorbers SA at this time is controlled using the hard characteristic (region b is the extension stroke side and region d is the compression stroke side). When the control signal V has the different sign as that of the relative velocity between the sprung mass and the unsprung mass (regions a and c), the stroke side of the shock absorber SA is controlled using the soft characteristic (region a is the compression stroke side and region c is the extension stroke side). In this way, the same control as a damping force characteristic based on a sky hook theory can be carried out only using the vertical acceleration sensor 1 and road wheel speed sensors $2_{FL}$, $2_{FR}$ and $2_{RL}$. Furthermore, when the control regions are transferred from the region a to the region b and from the region c to the region d, the switching of the damping force characteristic can be carried out without the drive to the corresponding one of the stepping motors 3.

Therefore, the following advantages occur in the first embodiment.

(1) Since the wheel speed sensors 2 serve to detect the sprung mass behaviors at positions nearer to the input side (road surface side that the vertical sprung mass acceleration sensor(s), both of the pitch rate and roll rate are derived on the basis of the respective wheel speed signals WVFL, WVFR, and WVRL so that the initial responsive characteristics are superior to those detected on the sprung mass side.

(2) Since no other axis components acted upon the vehicle body during the steering operation is included in the wheel speed signals WVFL, WVFR, and WVRL derived from the wheel speed sensors 2, the accuracy of the roll rate can be enhanced, thereby a control accuracy of each damping force characteristic being improved.

(3) Since the vehicular pitch rate and roll rate can be derived from the wheel speed signals WVFL, WVFR, and WVRL of the respective wheel speed sensors $2_{FL}$, $2_{FR}$, and $2_{RL}$ and the sensor used for controlling the damping force characteristic of each shock absorber includes the single vertical sprung mass acceleration (G) sensor 1 used to derive the vehicular bounce rate, a system cost of installing the damping force characteristic control apparatus can be reduced.

(4) Since the frequency of switching the damping force characteristics becomes reduced as compared with the previously proposed damping force characteristic controls based on the sky hook theory, the control response characteristic can be enhanced, and durability of the stepping motors and reduction in consumed power can be achieved.

Second Embodiment

Figure 19:
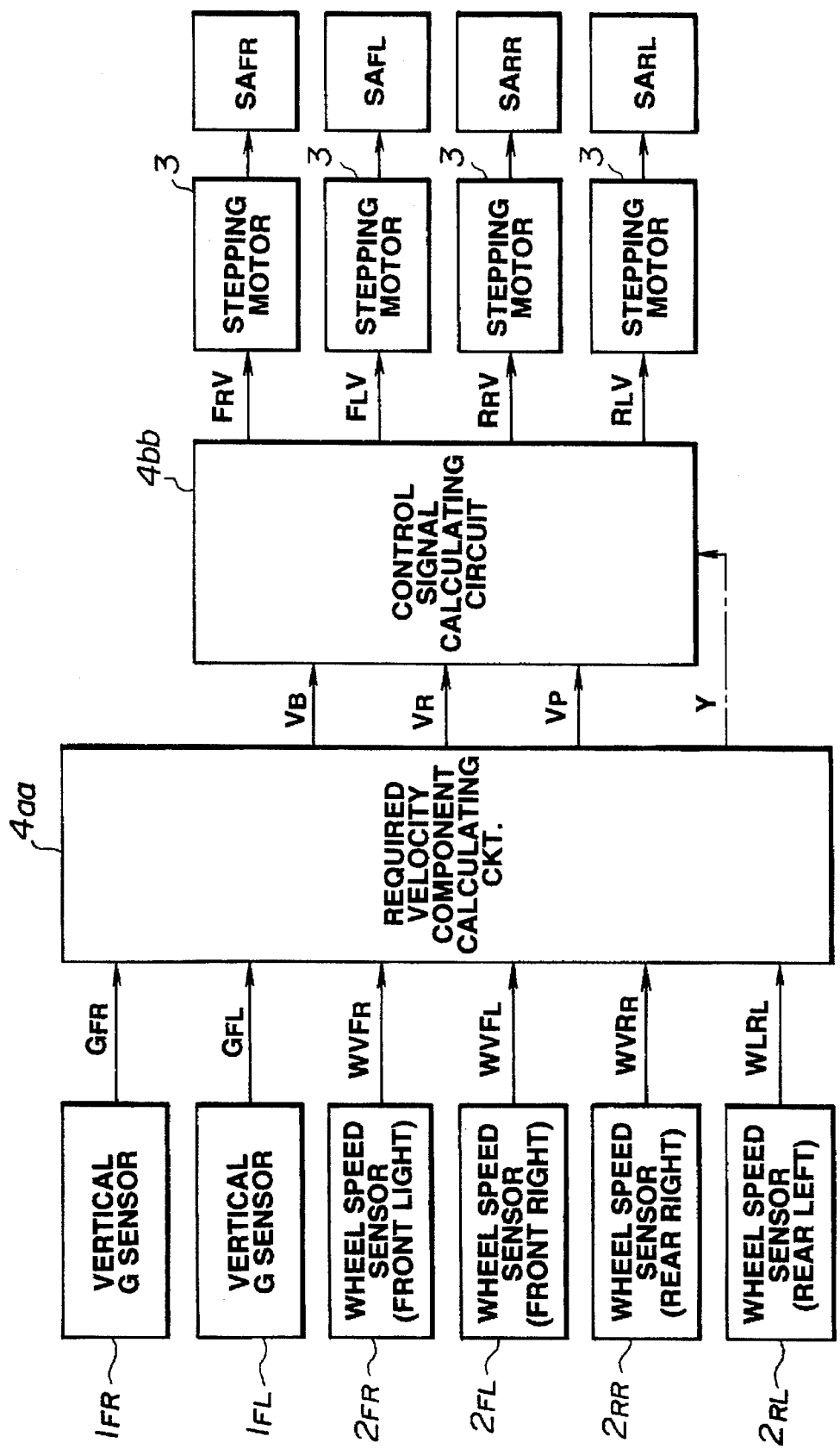
FIG. 19 is a schematic circuit block diagram of the damping force characteristic controlling apparatus in a second preferred embodiment according to the present invention.

FIG. 19 shows a circuit block diagram of the vehicular shock absorber damping force characteristic controlling apparatus in a second preferred embodiment according to the present invention.

As shown in FIG. 19, two vertical G sensors 1 ($1_{FL}$, $1_{FR}$) are disposed on parts of the vehicle body which are located adjacently on the front left and front right road wheel arranged positions. In addition, four wheel speed sensors 2 ($2_{FL}$, $2_{FR}$, $2_{RL}$, $2_{RR}$) are disposed on the front left and front right road wheels and rear left and right road wheels.

In the second embodiment, the required velocity component calculating circuit 4aa calculates the vehicular bounce component $V_B$ and the vehicular roll component on the basis of signals from the two vertical G sensors 1 ($1_{FL}$, $1_{FR}$) and calculates the vehicular pitch component $V_P$ on the signals from the four wheel speed sensors 2 ($2_{FL}$, $2_{FR}$, $2_{RL}$, $2_{RR}$).

That is to say, the bounce component $V_B$ and roll component $V_R$ are calculated using the vertical sprung mass velocity signals $FLV_n$, $FRV_n$ derived by integrating the acceleration signals $G_{FL}$ and $G_{FR}$ from the two vertical G sensors 1 ($1_{FL}$, $1_{FR}$) as follows:

$$V_B = (FLV_n - FRV_n)/2 \tag{8, and}$$

$$V_R = FRV_n - FLV_n \tag{9}$$

In addition, the pitch component $V_P$ is calculated on the basis of the following equations:

$$V_{P(n)} = (WVFL_{(n)} + WVFR_{(n)} + WVRL_{(n)})/4 \tag{10, and}$$

$$V_P = (V_{P(n)} + V_{(n-1)} + \cdots + V_{P(n-m)})/(m+1) \tag{11}$$

It is noted that the yaw rate signal Y derived from the wheel speed signal difference between the left and right front road wheels may be used as a correction signal to cancel the other axial components due to the lateral acceleration acted upon the vehicle body during the steering operation. The other structures of the damping force characteristic controlling apparatus in the second embodiment are the same as those in the first embodiment.

The same advantages as those in the case of the first embodiment can be achieved in the case of the second embodiment.

Third Embodiment

Figure 20:
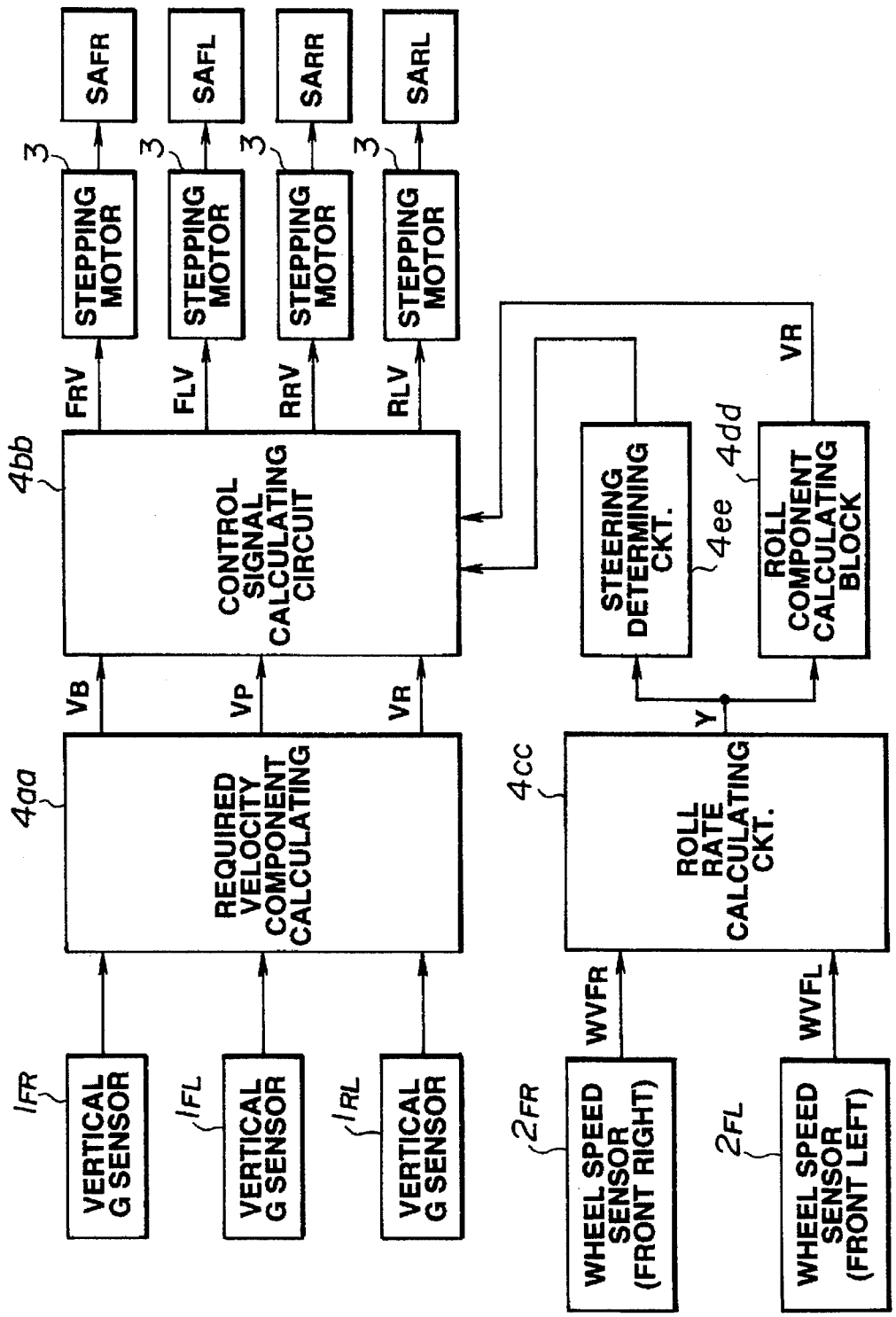
FIG. 20 is a schematic circuit block diagram of the damping force characteristic controlling apparatus in a third preferred embodiment according to the present invention.

FIG. 20 shows a circuit block diagram of the shock absorber damping force characteristic controlling apparatus in a third preferred embodiment according to the present invention.

As shown in FIG. 20, the three vertical G sensors 1 ($1_{FL}$, $1_{FR}$, $1_{RL}$) are installed at the front left and right road wheel arranged positions and the rear left road wheel arranged position of the vehicle body. In addition, the two wheel speed sensors 2 ($2_{FL}$, $2_{FR}$) are installed on the front left and right road wheels.

The required velocity component calculating circuit 4aa calculates the bounce component $V_B$, the pitch component $V_P$, and normal time roll component $V_R$ using the signals from the three vertical G sensors 1 ($1_{FL}$, $1_{FR}$, $1_{RL}$).

In addition, the yaw rate calculating circuit 4cc calculates the yaw rate signal Y on the basis of the signals from the wheel speed sensors $2_{FL}$ and $2_{FR}$ using the above-described equation (3) and the roll component calculating circuit 4dd derives the steering time roll component $V_R$ on the basis of the yaw rate signal Y. The steering determination circuit 4ee determines the steering operation based on the yaw rate signal Y.

That is to say, the vehicular pitch component $V_P$ calculates the vertical sprung mass velocity signal $FLV_n$ and $RLV_n$ derived by integrating both acceleration signals at the front left road wheel position and at the rear left road wheel position from the two vertical sprung mass G sensors 1 ($1_{FL}$ and $1_{RL}$) on the basis of the following equation (12). The bounce component $V_B$ and roll component $V_R$ are derived on the basis of the following equations (8) and (9) in the same way as the second embodiment.

$$V_p = FLV_n - RLV_n \quad (12)$$

Then, when the yaw rate signal Y is determined by the control signal calculating circuit 4bb to be not higher than a predetermined threshold valve, the control signals for the respective shock absorbers V (FLV, FRV, RLV, RRV) are calculated on the basis of the above-described equations (4), (5), (6), and (7). Then, on the basis of the control signal V thus calculated, the normal time damping force characteristic control is carried out. However, when the yaw rate signal Y increases and exceeds the predetermined threshold value, the control signals V (FLV, FRV, RLV, RRV) are calculated for the respective shock absorbers SA on the basis of the following equations (13) through (16). The steering time damping force characteristic control is carried out on the basis of the control signals V (FLV, FRV, RLV, RRV) using the following equations (13) through (16).

Front right road wheel: $FRV = \alpha_f V_B + \beta_f V_p + \tau_f V_R$ \quad (13), Front left road wheel: $FLV = \alpha \cdot V_B + \beta_f V_p - \tau_f V_R$ \quad (14), Rear right road wheel: $RRV = \alpha_r \cdot V_B - \beta_r \cdot V_p + \tau_r \cdot V_R$ \quad (15), and Rear left road wheel: $RLV = \alpha_r \cdot V_B - \beta_r \cdot V_p - \tau_r \cdot V_R$ \quad (16).

In details, during the steering operation, the damping force characteristic control is carried out using the roll component $V_R$ during the steering operation based on the vertical sprung mass velocity signals in place of the normal-time roll component $V_R$ based on the vertical sprung mass velocity signals.

Hence, the following advantages can be derived in the case of the third embodiment.

(1) Since the wheel speed sensors 2 serve to detect the sprung mass vertical behaviors from the more input side (road surface side) (as compared with the sprung mass vertical acceleration (G) sensors), the roll rate is derived from both right and left wheel speeds WVFL and WVFR. As compared with the detection on the sprung mass side, the initial response characteristic of the signals is preferable.

(2) Since the signals derived from the wheel speed sensors 2 do not include the other axial components due to the lateral acceleration acted upon the vehicle body during the steering operation, the determination accuracy of the roll rate based on the right and left road wheel speed WVFL and WVFR can be increased. Thus, the control accuracy can be improved.

Although the shock absorbers SA, in each of which the other phase (stroke side) of the damping force characteristic is fixed to the low damping force characteristic when one of the extension and compression phase is controlled to provide the hard damping force characteristic, are used, other shock absorbers, in which both of the extension phase and compression phase are controlled at the same time to vary the damping force characteristics may be used. The later shock absorber structure is exemplified by a U.S. Pat. No. 5,307,907.

Fourth Embodiment

Figure 21:
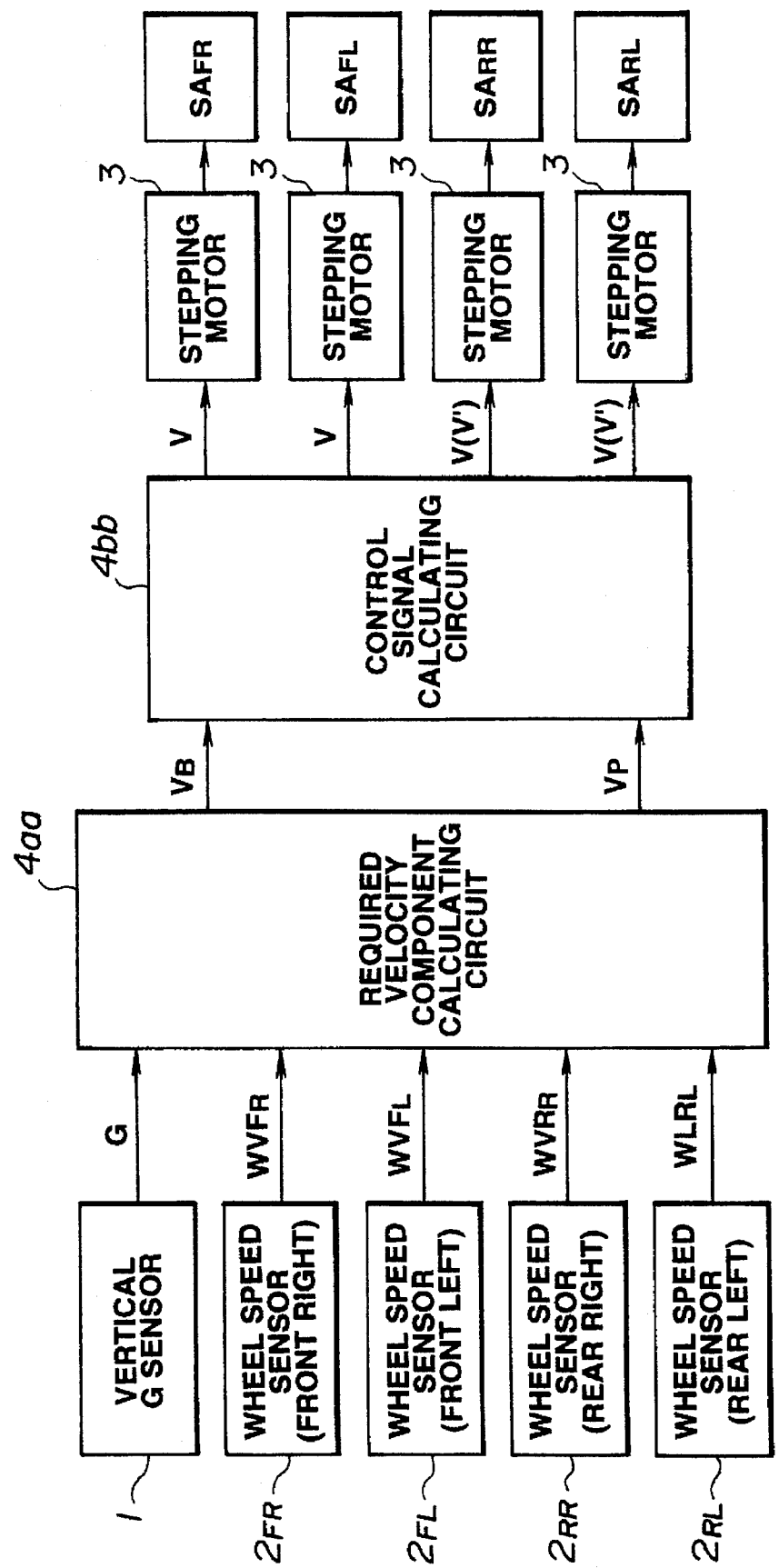
FIG. 21 is a schematic circuit block diagram of damping force characteristic controlling apparatus in a fourth embodiment according to the present invention.

FIG. 21 shows a circuit block diagram of the shock absorber damping force characteristic controlling apparatus in a case of a fourth preferred embodiment according to the present invention.

As shown in FIG. 21, the vertical sprung mass acceleration signal G from the vertical G (gravity) sensor 1 is converted into the vertical sprung mass velocity signal. The vehicular bounce component $V_B$ is calculated from the converted vertical sprung mass velocity signal. The pitch component $V_p$ is derived from the input signals from the four wheel speed sensors 2 ($2_{FL}$, $2_{FR}$, $2_{RL}$, $2_{RR}$) by the required velocity component calculating circuit 4aa. The control signal calculating circuit 4bb is installed which derives the control signal V and an inverted control signal V' into which the phase of the control signal V is inverted.

Figure 22A:
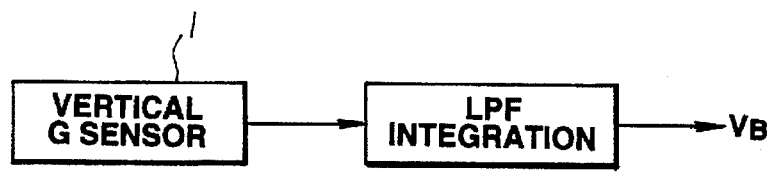
FIGS. 22A and 22B are schematic circuit block diagram of a signal processing circuit to derive $V_B$ (bounce rate) and pitch rate $V_P$ in the case of the fourth embodiment shown in FIG. 21.
Figure 22B:
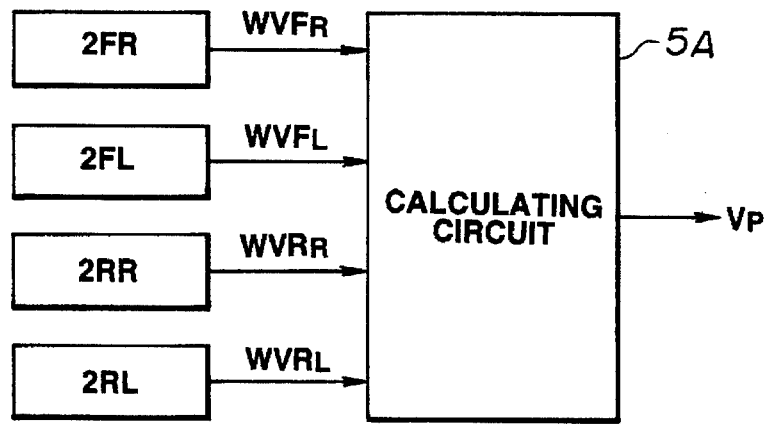

That is to say, the required velocity component calculating circuit 4aa includes the signal processing circuits shown in FIGS. 22A and 22B.

The bound component $V_B$ is derived through the LPF using the vertical acceleration signal of the vertical G sensor 1, as shown in FIG. 22A.

The pitch component $V_p$ is derived through the calculating circuit 5A shown in FIG. 22B.

The pitch component $V_p$ is derived using the equations of (10) and (11) described in the case of the second embodiment.

The structures of the shock absorbers SA are the same as those described in the case of the first embodiment. The other structures of the control unit, stepping motors, and the sensors are the same as those in the case of the first embodiment.

Figure 23:
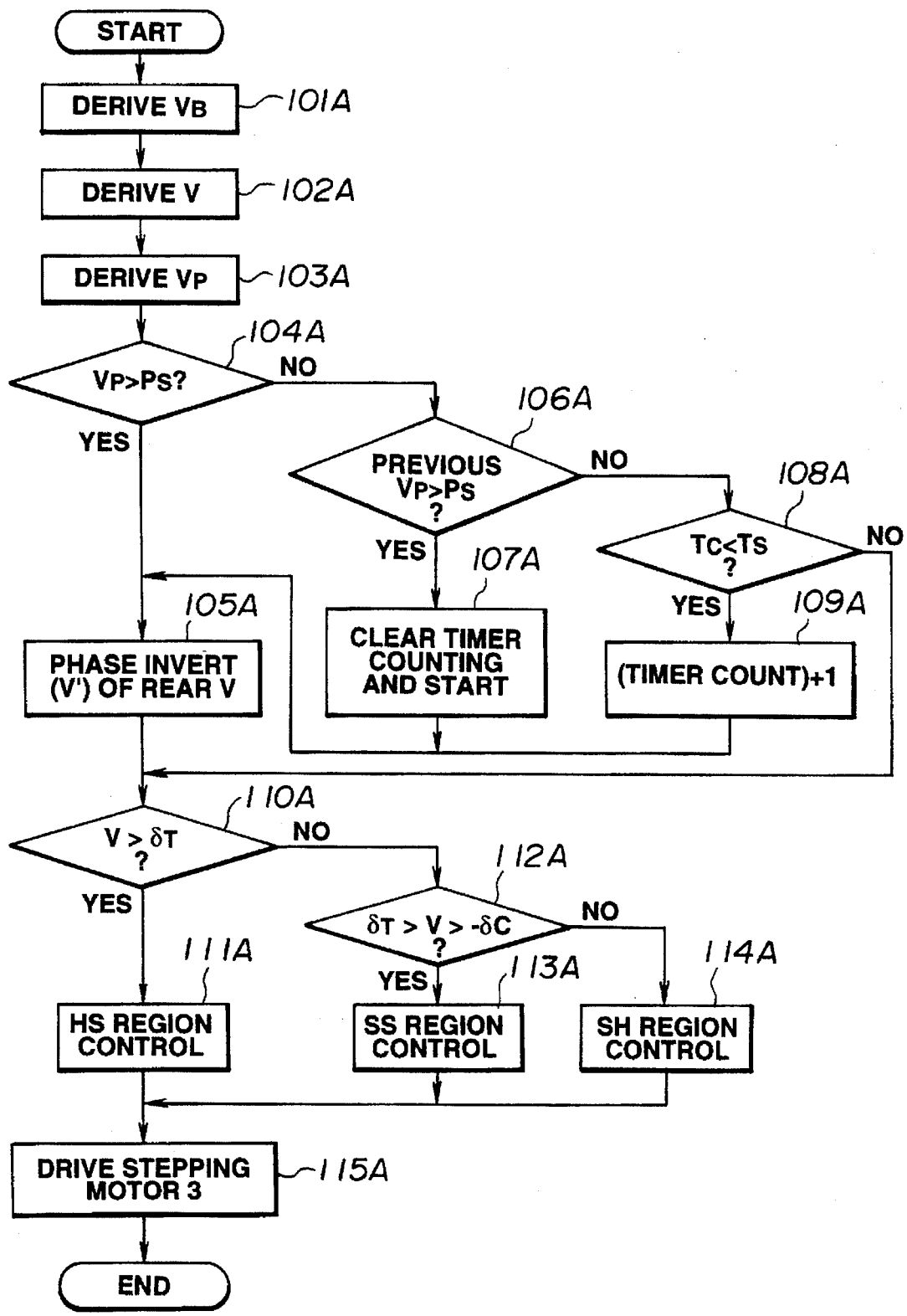
FIG. 23 is an operational flowchart executed in the fourth embodiment shown in FIG. 21.

Next, FIG. 23 shows control operational flowchart executed in the fourth embodiment.

This damping force characteristic control is carried out for each of the shock absorbers SA.

At a step 101A, the CPU 4b reads the vertical sprung mass acceleration signal from each vertical G sensor 1 and derives the bounce component $V_B$ on the basis of the vertical sprung mass velocity derived through the LPF shown in FIG. 22A. The positive value of $V_B$ is upward with respect to the earth (ground surface) and negative value thereof indicates the downward direction to the earth.

At a step 102A, the CPU 4b derives the control signal V on the basis of the following equation (12).

$$V = \alpha \cdot V_B \quad (12).$$

In the equation (12), α denotes a proportional constant.

At a step 103A, the CPU 4b reads the wheel speed signals for the respective road wheels from the wheel speed sensors $2_{FL}$, $2_{FR}$, $2_{RL}$, and $2_{RR}$ and derives the vehicular pitch rate $V_p$ by processing the wheel speed signals using the signal processing circuits shown in FIG. 22B. The positive value of $V_p$ indicates the squat direction and the negative value thereof indicates the dive direction.

At a step 104A, the CPU 4b determines whether the pitch rate $V_p$ is not lower than a predetermined threshold value $P_s$. If Yes at the step 104, the routine goes to a step 105A in which the phase inverted control signal V' is derived to which the phase of the control signal V is inverted. If No at the step 104A ($V_p \leq P_s$), the routine goes to a step 106A in which the CPU 4b determines whether the previously derived pitch rate $V_p$ has not been lower than the predetermined threshold value $P_s$. If Yes at the step 106A (previous $V_p > P_s$), the routine goes to a step 107A in which a time count value of a delay timer is cleared and the timer is started. Thereafter, the routine goes to a step 105A. If No at the step 106A, the routine goes to a step 108A in which the CPU 4b determine whether time count value $T_c$ of the delay timer is less than a predetermined delay time $T_s$. If Yes at the step 108A, the routine goes to a step 109A in which CPU 4b increments the time count value of the delay timer by +1. Then, the routine jumps to the step 105A. If No at the step 108A, the routine goes to a step 110A.

At the step 110A, the CPU 4b determines whether either of the control signal V or the phase inverted control signal V' is not higher than the predetermined threshold value $\delta_T$. If Yes at the step 110A (V (V')>$\delta_T$ the routine goes to a step 111A. If No at the step 110A, the routine goes to a step 112A.

At the step 111A, the CPU 4b controls the corresponding one of the shock absorbers SA such that the extension phase is in the hard region, i.e., HS. At this time, the target damping force characteristic C at the extension phase is controlled as C=$k_T$·V, wherein $k_T$ denotes the proportional constant at the extension phase.

At the step 112A, the CPU 4b determines whether either of the control signal V or the phase inverted control signal V' falls between the predetermined threshold value $\delta_T$ and the predetermined threshold value $-\delta_C$. If Yes at the step 112A, the routine goes to a step 113A in which the corresponding one of the shock absorbers SA is controlled in the soft region SS (both extension and compression phases are in the soft damping force characteristics). If No at the step 112A (V (V')=$\delta_T$ or V≦$-\delta_C$), the routine goes to a step 114A in which the corresponding one of the shock absorbers SA is controlled in the SH region (at the compression phase, the target damping force characteristic C is controlled as C=$k_c$·V). It is noted that $k_c$ denotes the compression phase proportional constant and at the extension phase, the soft damping force characteristic is fixed.

At a step 115A, the control unit 4 outputs the drive signal to the corresponding one of the stepping motors 3 to rotationally displace the adjuster 40 shown in FIG. 5 so that the damping force characteristic at either of the extension or compression phase is controlled to provide the target damping force characteristic.

Referring back to FIGS. 18A through 18E which are applicable to the fourth embodiment, the region a shown in FIG. 18C denotes a state in which the control signal V based on the vertical sprung mass velocity is inverted from a negative value (downward) to a positive value (upward). At this time, since the relative velocity between the sprung mass (vehicle body) and the unsprung mass (road wheel assemblies) still indicates the negative value (compression phase side at the stroke of the piston in the shock absorber SA), the shock absorber SA is controlled in the extension phase hard region HS (compression phase is in the soft region). Hence, at this region of HS, the soft characteristic is exhibited in the stroke direction of the shock absorber, i.e., the compression phase as shown in FIGS. 18D and 18E.

Figure 18:
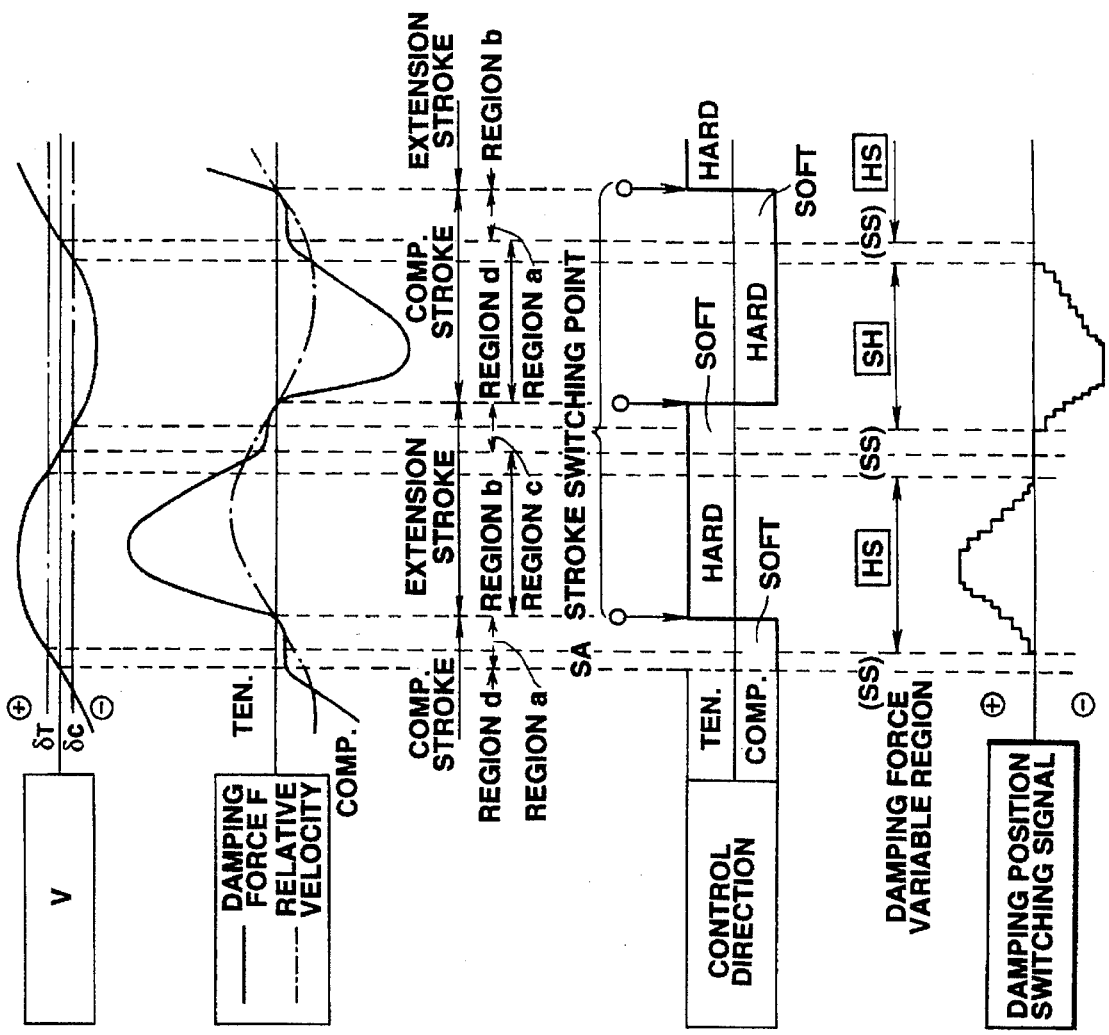
FIGS. 18A, 18B, 18C, 18D, and 18E are waveform timing charts of the damping force characteristic control operation in the control unit of the first embodiment shown in FIG. 2 and fourth embodiment shown in FIG. 21.

In addition, the region b shown in FIG. 18C denotes a region in which the direction of the control signal V is still positive (upward) and the relative velocity is switched from the negative value to the positive value (the stroke direction of the piston of the corresponding one of the shock absorber SA is in the extension phase). At this time, since the shock absorber SA is controlled in the extension phase hard region HS on the basis of the direction of the control signal V and, at the region b, the stroke direction of the shock absorber SA is in the extension phase. Hence, in the region b, the extension phase provides the harder damping force characteristic which is proportional to the value of the control signal V.

Next, the region c shown in FIG. 18C denotes the region in which the control signal V is reversed from the positive value (upward) to the negative value (downward). At this time, since the relative velocity is still positive (the stroke direction of the piston of the corresponding one of the shock absorbers SA is at the extension phase), the shock absorber SA is controlled in the compression hard region SH based on the direction of the control signal V. Hence, at this region c, the extension phase which is the stroke direction of the shock absorber SA indicates the soft characteristic.

Furthermore, the region d shown in FIG. 18C denotes a state in which the control signal V is still positive but the relative velocity is switched from the positive value to the negative value (extension phase is the stroke direction of the piston of the corresponding one of the shock absorbers SA). At this time, since the shock absorber SA based on the direction of the control signal V is controlled in the compression phase hard region SH and the stroke direction of the piston thereof is in the compression phase, the compression stroke direction of the shock absorber SA is the stroke direction toward which the harder damping force characteristic is exhibited which is proportional to the value of the control signal V.

As described above, in the fourth embodiment, when the control signal V based on the vertical sprung mass velocity has the same sign as that of the relative velocity between the sprung mass and unsprung mass (regions b and d), the stroke direction of the piston of the corresponding one of the shock absorbers SA, at times of these regions, is controlled using the hard damping force characteristic. When the control signal V has a different sign from that of the relative velocity (regions a and c), the stroke direction of the piston at the times of these regions is controlled using the soft characteristic. These series of the damping force characteristic control operations are based on a sky hook theory without an actual detection of the relative velocity between the sprung mass and unsprung mass.

In the fourth embodiment, when the region is transferred from the region a to the region b or from the region c to the region d, the switching of the damping force characteristic can be carried out without drive of the corresponding one of the stepping motors 3.

Next, FIGS. 24A, 24B, 24C, 25A, 25B, and 25C show signal timing charts for explaining the control operations when the vehicle having the damping force characteristic controlling apparatus in the fourth embodiment runs at a high speed range and at a low/medium speed range.

Figures 24A, 24B, 24C:
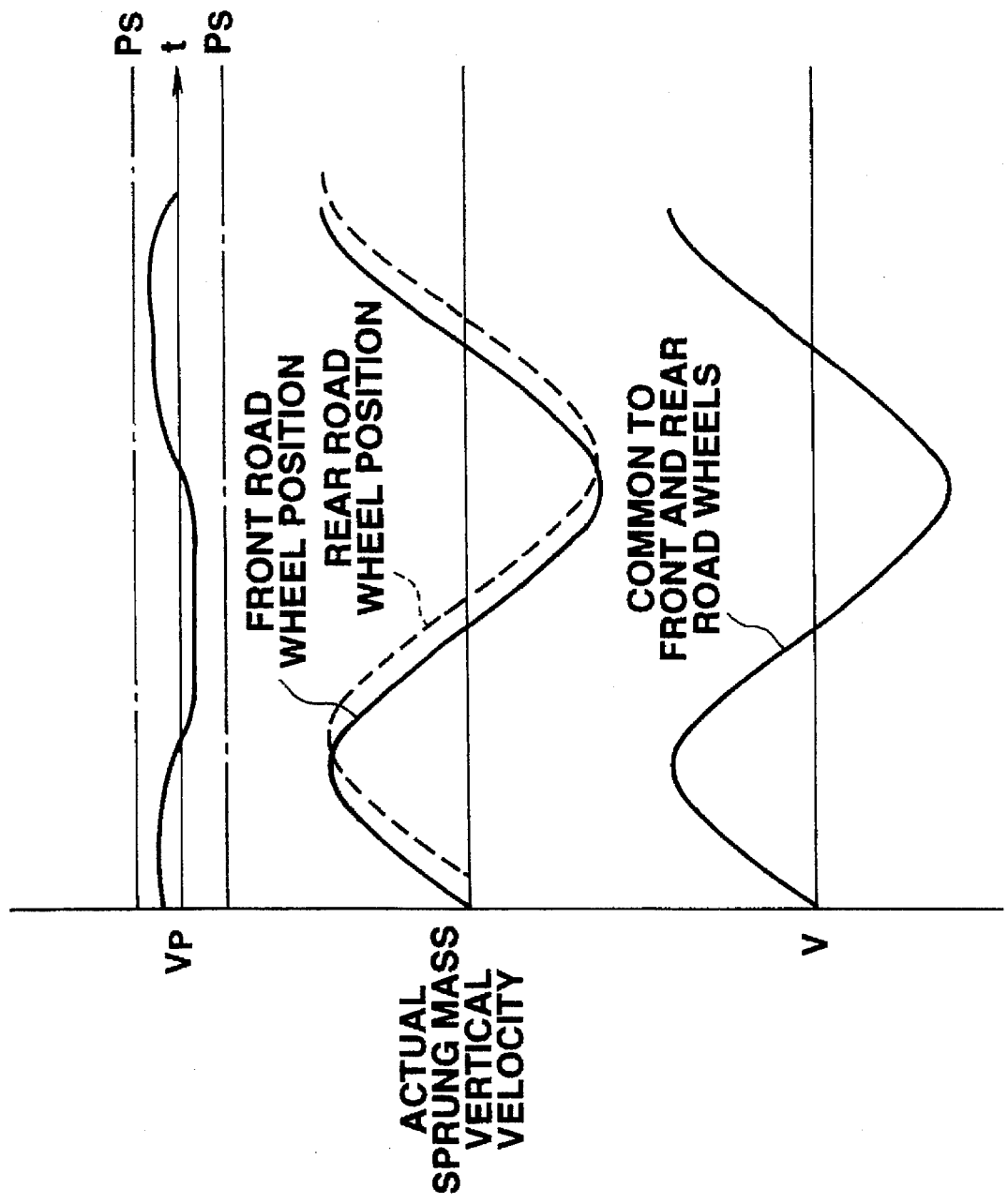
FIGS. 24A, 24B, and 24C are signal timing charts of the pitch rate, actual sprung mass vertical velocities, and control signal V in the case of the fourth embodiment shown in FIGS. 21 and 23.
Figures 25A, 25B, 25C, 25D:
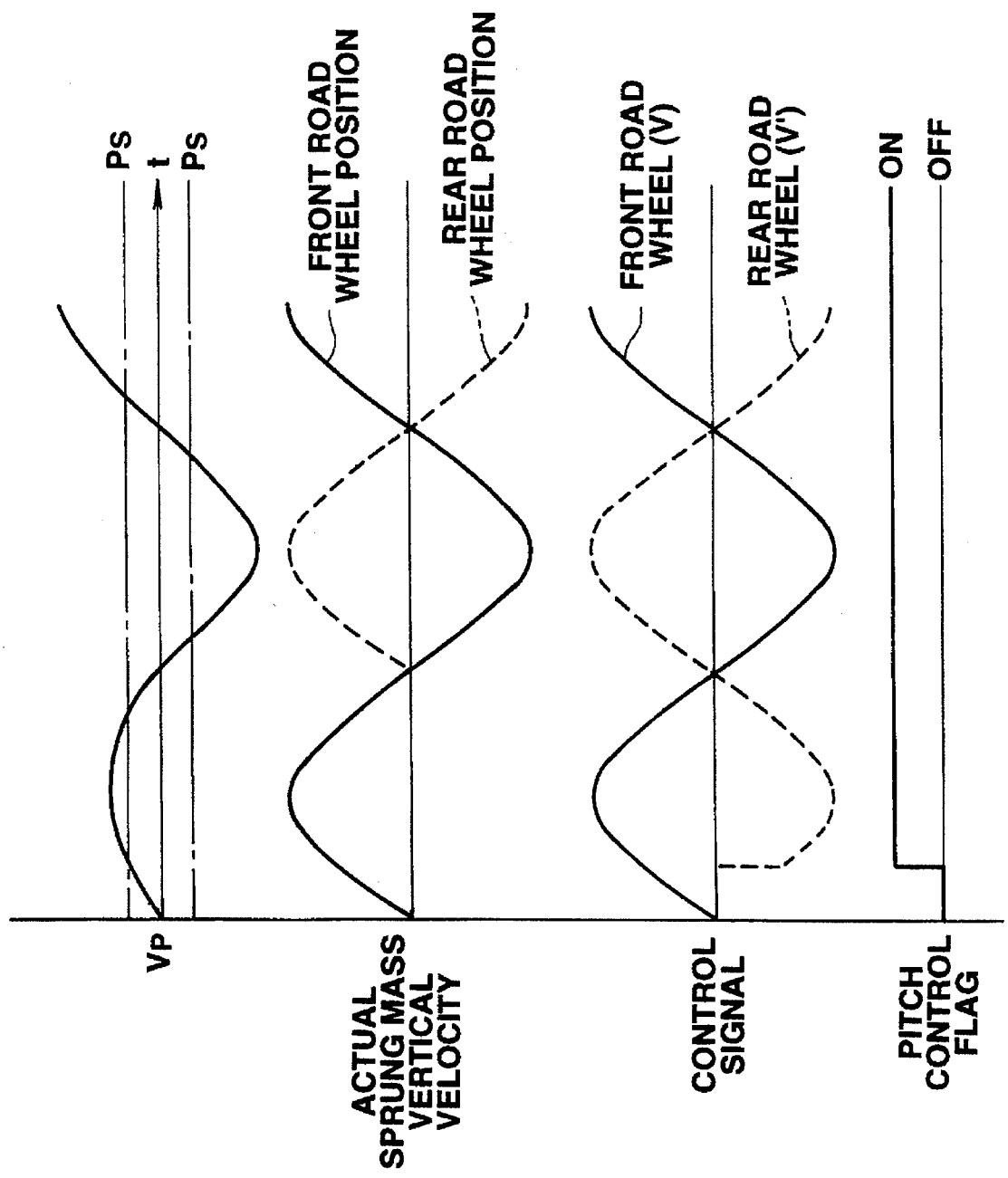
FIGS. 25A, 25B, 25C, and 25D are the pitch rate, actual sprung mass vertical velocities, control signal, and a pitch control flag in the fourth embodiment.

(1) When the vehicle runs at the high speed range:

As shown in FIGS. 24A through 24C, when the vehicle runs at the high speed range, the pitch rate $V_p$ derived from the average value of the respective front and rear road wheels is generally less than the predetermined threshold value $P_S$ and a phase difference in the vertical sprung mass velocities at the front and rear road wheel sides is small (i.e., the bounce mode). At this range, the damping force characteristics of the respective shock absorbers SA can be controlled on the basis of the common control signal V based on the vertical sprung mass velocity at the front road wheel position. Thus, the bounce of the vehicle can be suppressed.

(2) When the vehicle runs at the low/medium speed range except the above-described high speed range:

When the vehicle runs at the low/medium speed range, the pitch rate $V_p$ derived by the average value of each wheel speed of the front and rear road wheels is not less than the predetermined threshold value and the phase difference in the vertical sprung mass velocity at the front road arranged positions and the rear road wheel arranged positions becomes large. Thus, the vehicle behavior is in the pitch mode.

At this time, while the predetermined delay time $T_S$ has passed after the pitch rate $V_p$ is reduced and becomes less than the predetermined threshold value $P_s$, the damping force characteristics of the front road wheel arranged positioned shock absorbers $SA_{FL}$ and $SA_{FR}$ are controlled according to the control signals V based on the vertical sprung mass velocities at the front left and right road wheel positions and, on the other hand, those of the rear road wheel position arranged shock absorbers $SA_{RL}$ and $SA_{RR}$ are controlled according to the phase inverted control signals V' to whose phases those of the control signals V are inverted.

Hence, it is noted that the variably controlled stroke sides of the damping force characteristics of the shock absorbers at the rear road wheel arranged positions are opposite to those at the front road wheel arranged positions. Consequently, the vehicular bounce can effectively be suppressed.

As a first modification of the fourth embodiment, the two vertical G sensors 1 and 1 are disposed on parts of the vehicle body which are adjacent to the front left and right road wheels although the fourth embodiment teaches the single vertical G sensor 1. In this case, both bounce component $V_B$ and the roll component $V_R$ are calculated on the basis of the following equations (13) and (14) and according to the vertical sprung mass velocity signals $FLV_n$ and $FRV_n$ which are derived by integrating the vertical acceleration signals $G_{FL}$ and $G_{FR}$ from the two vertical G sensors 1 and 1. In this first modification, the control signals LV and RV (L denotes the left road wheel arranged positions and R denotes the right road wheel arranged positions) are calculated on the basis of the following equations (15) and (16).

$$V_B = (FLV_n + FRV_n)/2 \tag{13}$$

$$V_R = FLV_n - FRV_n \tag{14}$$

$$LV = \alpha \cdot V_B + \beta \cdot V_R \tag{15, and}$$

$$RV = \alpha \cdot V_B - \beta \cdot V_R \tag{16}$$

(in the equations (15) and (16), $\beta$ denotes the proportional constant.

As a second modification of the fourth embodiment, the three wheel speed sensors which are placed on the front right and left road wheels and placed on either one of the rear right or left road wheel may be used in place of the four wheel speed sensors $2_{FR}$, $2_{FL}$, $2_{RL}$, and $2_{RR}$ shown in FIG. 21.

In this second modification, the average value $V_{p(n)}$ can be calculated using the following equation (17).

$$V_{p(n)} = (WVFL_{(n)} + WVFR_{(n)} + WVRL_{(n)} \cdot 2)/4 \tag{17}$$

This equation (17) is the same as the equation (1) described in the first embodiment.

It is noted that the above-described predetermined threshold value $P_s$ may be varied according to the vehicle speed. It is also noted that the time count of the delay timer may be started upon a time at which the pitch rate $V_p$ crosses a zero point.

Various types of embodiments and modifications can be made within the scope of the present invention which will be defined by the appended claims.

What is claimed is:

1. An apparatus for an automotive vehicle comprising:

a) a plurality of shock absorbers, each being interposed between a given position of a vehicle body and a corresponding one of front right, front left, rear right, and rear left road wheels respectively located at the front right, front left, rear right, and rear left positions of the vehicle body and being so constructed and arranged as to enable a damping force characteristic of said each shock absorber to be varied;

b) damping force characteristic changing means, responsive to an input control signal V, for varying the damping force characteristic of each corresponding one of the respective shock absorbers;

c) at least three wheel speed sensors, which are so constructed and arranged as to detect wheel velocities of the road wheels located at the front right and front left positions of the vehicle body and as to detect at least one of wheel velocities of the road wheels located at the rear right and rear left positions of the vehicle body;

d) first determining means for determining at least one of a pitch component $V_p$ and a roll component $V_R$ of the vehicle on the basis of detected output signals from said wheel speed sensors;

e) vertical sprung mass behavior sensor means for detecting a sprung mass vertical behavior of the vehicle body, said vertical sprung mass behavior sensor means having at least one sprung mass vertical acceleration sensor arranged for detecting a vertical sprung mass acceleration;

f) second determining means for determining a vertical sprung mass velocity as a function of the vertical sprung mass acceleration from said sprung mass vertical acceleration sensor so as to derive a bounce component $V_R$ of the vehicle; and g) damping force characteristic controlling means for generating the control signal for each shock absorber on the basis of the calculated bounce component, the pitch component, and the roll component, either of the pitch component or the roll component being calculated on the basis of the detected output signals of said wheel speed sensors or on the basis of the determined vertical sprung mass velocity of the vertical sprung mass behavior sensor means, and outputting the control signal V to said damping force characteristic changing means associated with the corresponding one of the shock absorbers so as to vary the damping force characteristic in each corresponding one of the shock absorbers according to a value of the generated control signal.

2. An apparatus for an automotive vehicle as set forth in claim 1, wherein the roll component is calculated on the basis of a difference between the front right and front left road wheel velocities detected by said wheel speed sensors located at the front right and front left road wheels.

3. An apparatus for an automotive vehicle as set forth in claim 1, wherein the pitch component is calculated on the basis of an average value of the front and rear road wheel velocities detected by said wheel speed sensors located at either of the front left or front right road wheels and located at either of the rear left or rear right road wheels.

4. An apparatus for an automotive vehicle as set forth in claim 3, wherein said sprung mass vertical acceleration sensor is located on a predetermined position of the vehicle body.

5. An apparatus for an automotive vehicle as set forth in claim 4, wherein said pitch component $V_p$ of the vehicle is calculated as follows:

$$VP_{(n)} = (WVF_{L(n)} + WVF_{R(n)} + WVR_{L(n)} \cdot 2)/4,$$

$$V_p=(VP_{(n)}+VP_{(n-1)}+\cdots+VP_{n-m})/(m+1),$$

wherein $WVF_L$ denotes the wheel velocity of the front left road wheel, $WVF_R$ denotes the wheel velocity of the front right road wheel, $WVR_L$ denotes the wheel velocity of the rear right road wheel, (n) denotes the data sampled at an arbitrary timing, (n−1) denotes the data before one sampling time, (m) denotes an arbitrary integer.

6. An apparatus for an automotive vehicle as set forth in claim 5, wherein said roll component $V_R$ is calculated from a yaw rate signal generation circuit based on the follow equation: $Y=WVF_{R(n)}-WVF_{L(n)}$, from an output signal of a low pass filter LPF which is so constructed and arranged as to derive a roll angular signal $\theta_R$ and from an output signal of a high pass filter HPF which is so constructed and arranged as to derive the roll component $V_R$.

7. An apparatus for an automotive vehicle as set forth in claim 6, wherein said control signal V for the front right, front left, rear right, rear left shock absorbers (FRV, FLV, RRV, RLV) is calculated as:

$$FRV=\alpha_f V_B+\beta_f V_p+7_f V_R,$$

$$FLV=\alpha_f V_B+\beta_f V_p-7_f V_R,$$

$$RRV=\alpha_r \cdot V_B-\beta_r \cdot V_p+7_r \cdot V_R,$$

$$RLV=\alpha_r \cdot V_B-\beta_r \cdot V_p-7_r \cdot V_R,$$

wherein $\alpha_f$, $\beta_f$, and $7_f$ denote proportional constants for the front road wheels, and $\alpha_r$, $\beta_r$, and $7_r$ denote proportional constants for the rear road wheels, $\alpha_f V_B$ and $\alpha_r \cdot V_B$ denote the bounce rates at the front and rear road wheel positions of the vehicle body, $\beta_f V_p$ and $\beta_r \cdot V_p$ denote pitch rates at the front and rear road wheel positions of the vehicle body, and $7_f V_R$ and $7_r \cdot V_R$ denote roll rates at the front and rear road wheel positions of the vehicle body.

8. An apparatus for an automotive vehicle as claimed in claim 7, further comprising threshold value setting means for setting a predetermined threshold value for the derived yaw rate, wherein said control signal FLV, FRV, RLV, and RRV for each of the respective shock absorbers is calculated as:

$$FRV=\alpha_f V_B+\beta_f V_p+\tau_f V_R,$$

$$FLV=\alpha_f V_B+\beta_f V_p-\tau_f V_R,$$

$$RRV=\alpha_r V_B-\beta_r \cdot V_p+\tau_r \cdot V_R,$$

$$RLV=\alpha_r \cdot V_B-\beta_r \cdot V_p-\tau_r \cdot V_R, \text{ and}$$

wherein $V_R$ denotes the roll component derived on the basis of the difference between either of the front right or front left wheel speed and either of the rear right or rear left wheel speed when the derived yaw rate exceeds the predetermined threshold value.

9. An apparatus for an automotive vehicle as claimed in claim 7, further comprising a threshold value setting means for setting a predetermined threshold value, wherein said control signal FRV, FLV, RLV, and RRV for each of the respective shock absorbers is calculated as:

$$FRV=\alpha_f V_B+\beta_f V_p+\tau_f V_R,$$

$$FLV=\alpha_f V_B+\beta_f V_p-\tau_f V_R,$$

$$RRV=\alpha_r \cdot V_B-\beta_r \cdot V_p+\tau_r \cdot V_R,$$

$$RLV=\alpha_r \cdot V_B-\beta_r \cdot V_p-\tau_r \cdot V_R, \text{ and}$$

wherein $V_R$ is derived from said vertical sprung mass velocities of a plurality of said second determining means when said derived yaw rate is below said predetermined threshold value.

10. An apparatus for an automotive vehicle as set forth in claim 3, wherein said sprung mass vertical behavior sensor means comprises two vertical sprung mass acceleration sensors located on the vehicle body adjacent to the front right and front left shock absorbers and which are used to derive the roll component and bounce component, and said wheel speed sensors comprise four wheel speed sensors located at the front right, front left, rear right, and rear left road wheels and which are used to derive the pitch component.

11. An apparatus for an automotive vehicle as set forth in claim 10, wherein said bounce component $V_B$ is calculated as $V_B=(FLV_n+FRV_n)/2$, said roll component $V_R$ is calculated as $V_R=FRV_n-FLV_n$, wherein $FLV_n$ denotes a vertical sprung mass velocity at the front right road wheel positions of the vehicle body derived from the vertical sprung mass acceleration sensor located at the front right shock absorber at the time of n, $FRV_n$ denotes a vertical sprung mass velocity at the front left road wheel positions of the vehicle body derived from the vertical sprung mass acceleration sensor located at the front left shock absorber at the time of n, and wherein a pitch component $V_p$ is calculated as follows:

$$VP_{(n)}=(WVF_{L(n)}+WVF_{R(n)}+WVR_{L(n)}\cdot 2)/4,$$

$$V_p=(VP_{(n)}+VP_{(n-1)}+\cdots+VP_{(n-m)})/(m+1),$$

wherein $WVF_L$ denotes the wheel velocity of the front left road wheel, $WVF_R$ denotes the wheel velocity of the front right road wheel, $WVR_L$ denotes the wheel velocity of the rear right road wheel, (n) denotes the data sampled at an arbitrary timing, (n−1) denotes the data before one sampling time, (m) denotes an arbitrary integer.

12. An apparatus for an automotive vehicle as set forth in claim 10, wherein said pitch component $V_p$ is derived as follows: $Vp=FLV_n-RLV_n$, wherein $FLV_n$ denotes a vertical sprung mass velocity at the front left road wheel position of the vehicle body derived from the vertical sprung mass acceleration sensor located at the front left shock absorber and $RLV_n$ denotes said vertical sprung mass velocity at the rear left road wheel position of the vehicle body derived from the vertical sprung mass acceleration sensor.

13. An apparatus for an automotive vehicle as set forth in claim 3, wherein said sprung mass vertical behavior sensor means comprises two vertical sprung mass acceleration sensors located on the vehicle body adjacent to the front right and left shock absorbers and which are used to derive the roll component and one vertical sprung mass acceleration sensor located on the vehicle body adjacent to the rear left shock absorber and said wheel speed sensors comprise two wheel speed sensors located at the front right and front left road wheels and which are used to derive the pitch component.

14. An apparatus for an automotive vehicle as set forth in claim 3, wherein said vertical sprung mass behavior sensor means comprises said vertical sprung mass acceleration sensor located on the vehicle body adjacent to either one of the front right and front left shock absorbers, and wherein said damping force characteristic controlling means comprises:

third determining means for determining whether the calculated pitch rate is below a predetermined threshold value;

controlling means for controlling the damping force characteristics of the front and rear shock absorbers using the control signal generated on the basis of said vertical sprung mass velocity of the vehicle body located at the front shock absorbers derived from an output signal of the vertical sprung mass acceleration sensor when the calculated pitch rate is below the predetermined threshold value, for controlling the damping force characteristics of the front shock absorbers using the control signal via said corresponding damping force characteristic changing means generated on the basis of the vertical sprung mass velocity of the vehicle body located at the front shock absorbers when the pitch rate is equal to or above the predetermined threshold value and thereafter a predetermined time has passed upon the decrease of the calculated pitch rate below the predetermined threshold value, and for controlling the damping force characteristics of the rear shock absorbers using a phase inverted control signal having a phase which is an inversion of a phase of the control signal generated on the basis of the vertical sprung mass velocity via said damping force characteristic changing means.

15. An apparatus for an automotive vehicle as set forth in claim 14, wherein each of said shock absorbers is so constructed and arranged that the damping force characteristic at one of extension and compression stroke side with respect to a piston is variably controlled while that at either or the extension and compression stroke side opposite to the damping force variably controlled stroke side is fixed to a predetermined low damping force characteristic and wherein, when a direction determination sign of either the control signal or phase inverted control signal is positive toward the sprung mass, the extension stroke side of the respective shock absorbers are variably controlled according to the value of the control signal or the phase inverted control signal, and when the direction determination sign is negative toward an unsprung mass, the compression stroke sides of the respective shock absorbers are variably controlled according to the value of the control signal or phase inverted control signal.

16. A method for controlling vehicle shock absorbers, said vehicle shock absorbers comprising: a plurality of shock absorbers, each being interposed between a given position of a vehicle body and a corresponding one of front right, front left, rear right, and rear left road wheels respectively located at the front right, front left, rear right, and rear left positions of the vehicle body and being so constructed and arranged as to enable a damping force characteristic of said shock absorbers to be varied, the method comprising the steps of:

a) responsive to an input control signal, varying the damping force characteristic of a corresponding one of the respective shock absorbers;

b) detecting wheel velocities of the road wheels located at the front right and front left positions of the vehicle body and detecting at least one of wheel velocities of the road wheels located at the rear right and rear left positions of the vehicle body;

c) calculating at least one of a pitch rate and a roll rate of the vehicle on the basis of detected output signals from said step b);

d) detecting a sprung mass vertical behavior of the vehicle body and determining a bounce component on the basis of the sprung mass vertical behavior of the vehicle body; and e) generating said control signal on the basis of the calculated bounce component, the pitch component, and the roll component calculated on the basis of the detected output signals at said step b) or step d) and outputting the control signal used at said step a) according to a value of the generated control signal.

17. An apparatus for an automotive vehicle, comprising:

a) a plurality of shock absorbers, each being interposed between a given position of a vehicle body and a corresponding one of front right, front left, rear right, and rear left road wheels respectively located at the front right, front left, rear right, and rear left positions of the vehicle body and being so constructed and arranged as to enable a damping force characteristic of the shock absorbers to be varied;

b) damping force characteristic changing means, responsive to an input control signal V, for varying the damping force characteristic of each corresponding one of the respective shock absorbers;

c) at least three wheel speed sensors, which are constructed and arranged so as to detect wheel velocities of the road wheels located at the front right and front left positions of the vehicle body and to detect at least one of wheel velocities of the road wheels located at the rear right and rear left positions of the vehicle body;

d) first determining means for determining at least one of a pitch component $V_p$ and a roll component of the vehicle on the basis of detected output signals from said wheel speed sensors;

e) vertical sprung mass behavior sensor means for detecting a sprung mass vertical behavior of the vehicle body, said vertical sprung mass behavior sensor means having at least one sprung mass vertical acceleration sensor arranged for detecting a vertical sprung mass acceleration;

f) second determining means for determining a vertical sprung mass velocity as a function of the vertical sprung mass acceleration from said sprung mass vertical acceleration sensor so as to derive a bounce component of the vehicle; and g) damping force characteristic controlling means for generating the control signal for each shock absorber on the basis of the calculated bounce component, the pitch component, and the roll component, either of the pitch component or the roll component being calculated on the basis of the detected output signals of said wheel speed sensors or on the basis of the determined vertical sprung mass velocity of the vertical sprung mass behavior sensor means, and for outputting the control signal V to said damping force characteristic changing means associated with the corresponding one of the shock absorbers so as to vary the damping force characteristics in each corresponding one of the shock absorbers according to a value of the generated control signal, wherein the roll component is calculated on the basis of a difference between the front right and front left road wheel velocities detected by said wheel speed sensors located at the front right and front left road wheels, wherein the pitch component is calculated on the basis of an average value of the front and rear road wheel velocities detected by said wheel speed sensors located at either of the front left or front right road wheels and located at either of the rear left or rear right road wheels, wherein said sprung mass vertical acceleration sensor is located on a predetermined position of the vehicle body, and wherein said pitch component $V_p$ of the vehicle is calculated as follows:

$$VP_{(n)}=(WVP_{L(n)}+WVF_{R(n)}+WVR_{L(n)}2)/4,$$

$$V_p=(VP_{(n)}+VP_{(n-1)}+\cdots+VP_{(n-m)})/(m+1), \text{ and}$$

wherein $WVF_L$ denotes the wheel velocity of the front left road wheel, $WVF_R$ denotes the wheel velocity of the front right road wheel, $WVR_L$ denotes the wheel velocity of the rear right road wheel, (n) denotes the data sampled at an arbitrary timing, (n−1) denotes the data before one sampling time, and (m) denotes an arbitrary integer.

* * * * *